United States Patent
Baba et al.

(10) Patent No.: US 12,303,831 B2
(45) Date of Patent: May 20, 2025

(54) EXHAUST GAS PURIFICATION SYSTEM

(71) Applicant: MITSUI MINING & SMELTING CO., LTD., Tokyo (JP)

(72) Inventors: Takashi Baba, Saitama (JP); Hiroki Kurihara, Saitama (JP)

(73) Assignee: Mitsui Mining & Smelting Co., Ltd., Tokyo (JP)

(*) Notice: Subject to any disclaimer, the term of this patent is extended or adjusted under 35 U.S.C. 154(b) by 364 days.

(21) Appl. No.: 17/792,756

(22) PCT Filed: Jan. 13, 2021

(86) PCT No.: PCT/JP2021/000755
§ 371 (c)(1),
(2) Date: Jul. 14, 2022

(87) PCT Pub. No.: WO2021/145326
PCT Pub. Date: Jul. 22, 2021

(65) Prior Publication Data
US 2023/0050366 A1    Feb. 16, 2023

(30) Foreign Application Priority Data

Jan. 14, 2020   (JP) ............................ 2020-003874

(51) Int. Cl.
*B01D 53/94* (2006.01)
*B01J 23/63* (2006.01)
(Continued)

(52) U.S. Cl.
CPC .............. *B01D 53/94* (2013.01); *B01J 23/63* (2013.01); *B01J 35/56* (2024.01); *F01N 3/022* (2013.01); *F01N 3/035* (2013.01); *F01N 3/28* (2013.01)

(58) Field of Classification Search
CPC .... B01D 2255/1023; B01D 2255/1025; B01D 2255/407; B01D 2255/9025;
(Continued)

(56) References Cited

U.S. PATENT DOCUMENTS

| | | | |
|---|---|---|---|
| 4,806,519 A * | 2/1989 | Chiba | B01J 37/0244 502/252 |
| 7,506,504 B2 * | 3/2009 | Kumar | F01N 13/0097 422/177 |

(Continued)

FOREIGN PATENT DOCUMENTS

| | | |
|---|---|---|
| JP | 2003-503191 A | 1/2003 |
| JP | 2010-29752 A | 2/2010 |

(Continued)

OTHER PUBLICATIONS

International Search Report (ISR) dated on Mar. 23, 2021 filed in PCT/JP2021/000755.
(Continued)

*Primary Examiner* — Jesse S Bogue
(74) *Attorney, Agent, or Firm* — RANKIN, HILL & CLARK LLP

(57) ABSTRACT

An object of the present invention is to provide an exhaust gas purification system including a first exhaust gas treatment section provided upstream in an exhaust pathway of an internal-combustion engine, a second exhaust gas treatment section provided upstream in the exhaust pathway of the internal-combustion engine, wherein the exhaust gas purification system allows rhodium element contained in a catalyst layer of the second exhaust gas treatment section to efficiently exhibit the catalytic activity, and the present invention provides an exhaust gas purification system (1) configured to purify exhaust gas emitted from an internal-combustion engine, the exhaust gas purification system (1) including an exhaust gas path (2) through which exhaust gas (Continued)

flows, a first exhaust gas treatment section (3) provided upstream in the exhaust gas path (2), and a second exhaust gas treatment section (4) provided downstream in the exhaust gas path (2); wherein first catalyst layers of the first exhaust gas treatment section (3) each contain cerium element; wherein a percentage of the mass of the cerium element contained in the first catalyst layers in terms of cerium oxide, to the mass of the first catalyst layers, is 5.0% by mass or more and 13.0% by mass or less; and wherein second catalyst layers of the second exhaust gas treatment section (4) each contain rhodium element.

17 Claims, 5 Drawing Sheets

(51) Int. Cl.
  B01J 35/56 (2024.01)
  F01N 3/022 (2006.01)
  F01N 3/035 (2006.01)
  F01N 3/28 (2006.01)
(58) Field of Classification Search
  CPC ...... B01D 2255/9032; B01D 2255/908; B01D 2255/9207; B01D 2258/012; B01D 53/94; B01D 53/9454; B01J 23/002; B01J 23/63; B01J 35/19; B01J 35/56; B01J 35/613; B01J 37/0009; B01J 37/0018; B01J 37/0201; B01J 37/0219; B01J 37/0244; B01J 37/088; F01N 13/0097; F01N 2510/0682; F01N 2510/0684; F01N 3/022; F01N 3/0222; F01N 3/035; F01N 3/28; Y02T 10/12
  See application file for complete search history.

(56) References Cited

U.S. PATENT DOCUMENTS

| 8,173,087 | B2* | 5/2012 | Wei | F01N 13/011 |
| | | | | 423/247 |
| 10,260,395 | B2* | 4/2019 | Li | B01J 23/894 |
| 10,933,373 | B2* | 3/2021 | Deibel | F01N 3/021 |
| 11,185,819 | B2* | 11/2021 | Cravillon | B01J 35/19 |
| 11,473,471 | B2* | 10/2022 | Xue | F01N 3/2073 |
| 2003/0108465 | A1* | 6/2003 | Voss | B01J 23/10 |
| | | | | 502/64 |
| 2003/0124037 | A1* | 7/2003 | Voss | F01N 13/009 |
| | | | | 422/177 |
| 2006/0057046 | A1 | 3/2006 | Punke et al. | |
| 2011/0030346 | A1 | 2/2011 | Neubauer et al. | |
| 2011/0041486 | A1 | 2/2011 | Kato et al. | |
| 2012/0189503 | A1* | 7/2012 | Akamine | B01J 35/40 |
| | | | | 422/171 |
| 2014/0301924 | A1 | 10/2014 | Morgan | |
| 2015/0107228 | A1* | 4/2015 | Klingmann | B01D 53/945 |
| | | | | 60/297 |
| 2017/0296969 | A1 | 10/2017 | Ohashi et al. | |
| 2018/0021726 | A1 | 1/2018 | Onoe et al. | |
| 2018/0347425 | A1 | 12/2018 | Otsuka et al. | |
| 2019/0388873 | A1* | 12/2019 | Goto | F01N 3/0222 |

FOREIGN PATENT DOCUMENTS

| JP | 2012-152696 A | 8/2012 |
| JP | 2013-500857 A | 1/2013 |
| JP | 2013-99748 A | 5/2013 |
| JP | 2018-189092 A | 11/2018 |
| JP | 2019-147111 A | 9/2019 |
| WO | 2016/056573 A1 | 4/2016 |
| WO | 2016/133085 A1 | 8/2016 |
| WO | 2017/051458 A1 | 3/2017 |

OTHER PUBLICATIONS

PCT Notification of Transmittal of Translation of the International Preliminary Report On Patentability and Written Opinion of the International Searching Authority dated Jul. 28, 2022 filed in PCT/JP2021/000755.

* cited by examiner

EXHAUST GAS PURIFICATION SYSTEM

BACKGROUND OF THE INVENTION

Field of the Invention

The present invention relates to an exhaust gas purification system.

Background Art

Exhaust gas emitted from an internal combustion engine of an automobile, a motorcycle, or the like contains harmful components such as hydrocarbons (HC), carbon monoxide (CO), and nitrogen oxide (NOx). A three-way catalyst is used to purify and detoxify those harmful components. Noble metal catalysts such as platinum (Pt), palladium (Pd), and rhodium (Rh) are used as a three-way catalyst. Pt and Pd are mainly involved in oxidative purification of HC and CO, and Rh is mainly involved in reductive purification of NOx.

It is desirable that an air-fuel ratio A/F during supply to an internal combustion engine be controlled to be near a theoretical air-fuel ratio (stoichiometry). However, since an actual air-fuel ratio swings, with a stoichiometry at a center, to a rich side (fuel-rich atmosphere) or a lean side (fuel-lean atmosphere), depending on driving conditions of a motor vehicle or the like, an air-fuel ratio of exhaust gas similarly swings to a rich or lean side. Due to this, in order to decrease a change in an oxygen concentration in exhaust gas and improve an exhaust gas purifying performance of a catalyst, a material having an ability to absorb oxygen when the oxygen concentration in the exhaust gas is high and release oxygen when the oxygen concentration in the exhaust gas is low (i.e., oxygen storage capacity (OSC)) (hereinafter, may be referred to as "OSC material"), for example, a $CeO_2$—$ZrO_2$-based complex oxide, is used It is known that exhaust gas contains particulate matter (PM) in addition to harmful components such as HC, CO, and NOx, and such particulate matter causes air pollution. For example, a gasoline direct injection engine (GDI engine) used in a vehicle equipped with a gasoline engine is fuel-efficient and high-power, but is known to discharge a larger amount of PM in exhaust gas than a conventional port injection engine. In order to respond to an environmental regulation on PM, the installation of a filter with a PM collecting function (GPF: Gasoline Particulate Filter) is required, not only for a vehicle equipped with a diesel engine, but also for a vehicle equipped with a gasoline engine such as GDI.

For example, a substrate having a structure called a wall-flow structure is used as a GPF. In the wall-flow substrate, when exhaust gas flows in from a cell inlet, passes through a porous partition wall separating cells from one another, and flows out from a cell outlet, PM in the exhaust gas is collected in pores inside the partition wall.

Since space for installing an exhaust gas purification catalyst is usually limited, technologies for collecting PM and purifying harmful components such as HC, CO, and NOx by supporting a noble metal catalyst such as Pt, Pd, and Rh on a GPF have been studies.

For example, Patent Literature 1 discloses a GPF including: a substrate; a catalyst layer formed on a surface on a cell inlet side of a partition wall of the substrate; and a catalyst layer formed on a surface on a cell outlet side of the partition wall of the substrate.

In addition, Patent Literature 2 discloses an exhaust gas purification system including: a catalyst converter disposed upstream in an exhaust pathway of an internal combustion engine; and a GPF disposed downstream in the exhaust pathway of the internal combustion engine, and thereby removing harmful components in the exhaust gas and collecting PM in the exhaust gas.

CITATION LIST

Patent Literatures

Patent Literature 1: JP 2013-099748 A
Patent Literature 2: JP 2018-189092 A

SUMMARY OF THE INVENTION

Technical Problem

In cases where a catalyst converter is disposed upstream in an exhaust pathway of an internal-combustion engine, and where a GPF including catalyst layers each containing rhodium element are disposed downstream in the exhaust pathway of the internal-combustion engine, a technology designed to allow the rhodium element contained in the catalyst layers of the GPF to efficiently exhibit the catalytic activity (for example, NOx purification performance) is required.

For example, excessive oxidation of the rhodium element decreases the catalytic activity (for example, NOx purification performance) of the rhodium element. On the other hand, the oxygen concentration of the exhaust gas supplied to the GPF through the catalyst converter is affected by an OSC material contained in the catalyst converter. Accordingly, it is desirable that the amount of the OSC material contained in the catalyst converter is adjusted in order to prevent the catalytic activity of the rhodium element contained in the catalyst layers of the GPF (in particular, catalyst layers that are located immediately after the catalyst converter, and first comes in contact with the exhaust gas supplied to the GPF through the catalyst converter, in other words, catalyst layers formed on the cell inlet side of the substrate in the GPF) from being decreased through the influence of the oxygen concentration of the exhaust gas supplied to the GPF through the catalyst converter. Additionally, in order that the rhodium element contained in the catalyst layers of the GPF can efficiently exhibit the catalytic activity, it is desirable to lengthen the time during which the rhodium element contained in the catalyst layers of the GPF is in contact with the exhaust gas supplied to the GPF through the catalyst converter.

Thus, an object of the present invention is to provide an exhaust gas purification system including: a first exhaust gas treatment section (corresponding to a catalyst converter) provided upstream in an exhaust pathway of an internal-combustion engine; and a second exhaust gas treatment section (corresponding to a GPF) provided downstream in the exhaust pathway of the internal-combustion engine, wherein the exhaust gas purification system allows the rhodium element contained in the catalyst layers of the second exhaust gas treatment section (in particular, catalyst layers that are located immediately after the first exhaust gas treatment section, and first comes in contact with the exhaust gas supplied to the second exhaust gas treatment section through the first exhaust gas treatment section, in other words, catalyst layers formed on the cell inlet side of the substrate in the second exhaust gas treatment section) to efficiently exhibit the catalytic activity (for example, NOx purification performance).

Solution to Problem

To solve the abovementioned problems, the present invention provides an exhaust gas purification system configured to purify exhaust gas emitted from an internal combustion engine,
the exhaust gas purification system including:
an exhaust gas path through which exhaust gas flows;
a first exhaust gas treatment section provided upstream in the exhaust gas path; and
a second exhaust gas treatment section provided downstream in the exhaust gas path,
wherein the first exhaust gas treatment section includes:
a flow-through type substrate; and
first catalyst layers,
wherein the flow-through type substrate includes:
cells each extending in the exhaust gas flow direction, and each having an open end on an exhaust gas inflow side thereof in the exhaust gas flow direction and an open end on an exhaust gas outflow side thereof in the exhaust gas flow direction; and
a partition wall separating the cells from one another,
wherein the first catalyst layers each include a portion that is formed on a surface of the partition wall,
wherein the second exhaust gas treatment section includes:
a wall-flow type substrate;
second catalyst layers; and
third catalyst layers,
wherein the wall-flow type substrate includes:
inflow-side cells each extending in the exhaust gas flow direction, and each having an open end on an exhaust gas inflow side thereof in the exhaust gas flow direction and a closed end on an exhaust gas outflow side thereof in the exhaust gas flow direction;
outflow-side cells each extending in the exhaust gas flow direction, and each having a closed end on an exhaust gas inflow side thereof in the exhaust gas flow direction and an open end on an exhaust gas outflow side thereof in the exhaust gas flow direction; and
a porous partition wall separating the inflow-side cells and the outflow-side cells from one another,
wherein the second catalyst layers each have a portion that is formed on a surface on an inflow-side cell side of the partition wall, and extends from an end on an exhaust gas inflow side of the partition wall along the exhaust gas flow direction, and
wherein the third catalyst layers each have a portion that is formed on a surface on an outflow-side cell side of the partition wall, and extends from an end on an exhaust gas outflow side of the partition wall along a direction opposite to the exhaust gas flow direction;
wherein the first catalyst layers each contain cerium element,
wherein a percentage $P_1$ of a mass of the cerium element contained in the first catalyst layers in terms of cerium oxide, to a mass of the first catalyst layers, is 5.0% by mass or more and 13.0% by mass or less, and
wherein the second catalyst layers each contain rhodium element.

Advantageous Effects of Invention

The present invention provides an exhaust gas purification system including: a first exhaust gas treatment section (corresponding to a catalyst converter) provided upstream in an exhaust pathway of an internal-combustion engine; and a second exhaust gas treatment section (corresponding to a GPF) provided downstream in the exhaust pathway of the internal-combustion engine, wherein the exhaust gas purification system allows the rhodium element contained in the catalyst layers of the second exhaust gas treatment section (in particular, catalyst layers that are located immediately after the first exhaust gas treatment section, and first comes in contact with the exhaust gas supplied to the second exhaust gas treatment section through the first exhaust gas treatment section, in other words, catalyst layers formed on the cell inlet side of the substrate in the second exhaust gas treatment section) to efficiently exhibit the catalytic activity (for example, NOx purification performance).

DETAILED DESCRIPTION OF THE INVENTION

Figure 1:
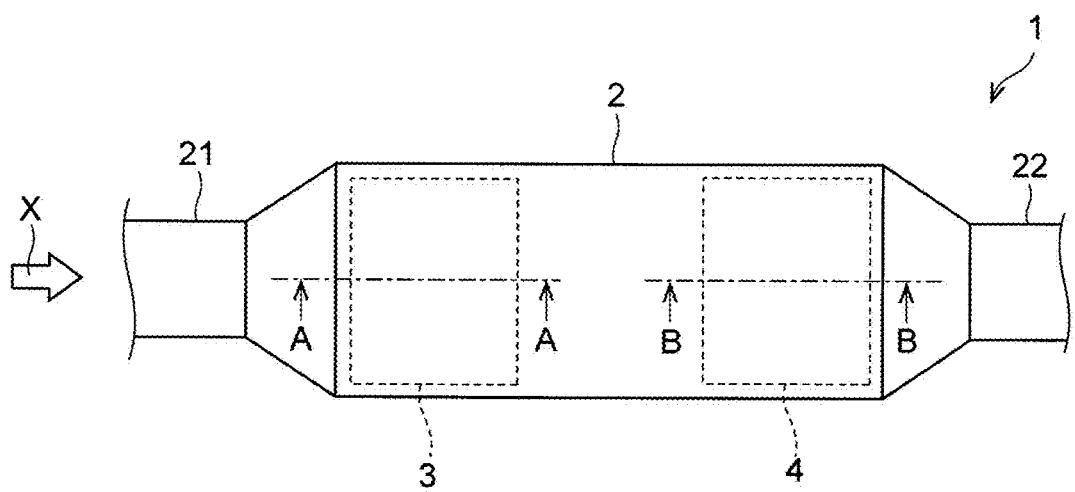
FIG. 1 is a plan view of an exhaust gas purification system according to one embodiment of the present invention.
Figure 2:
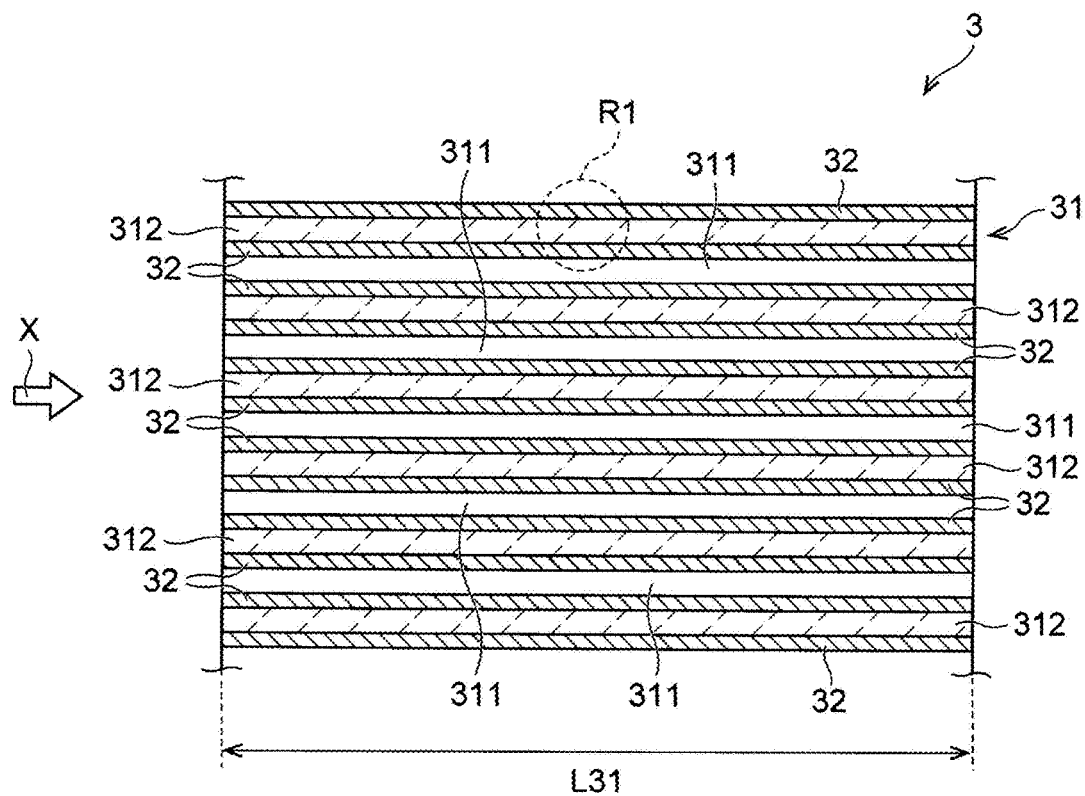
FIG. 2 is a cross-sectional view taken along the line A-A in FIG. 1.
Figure 3:
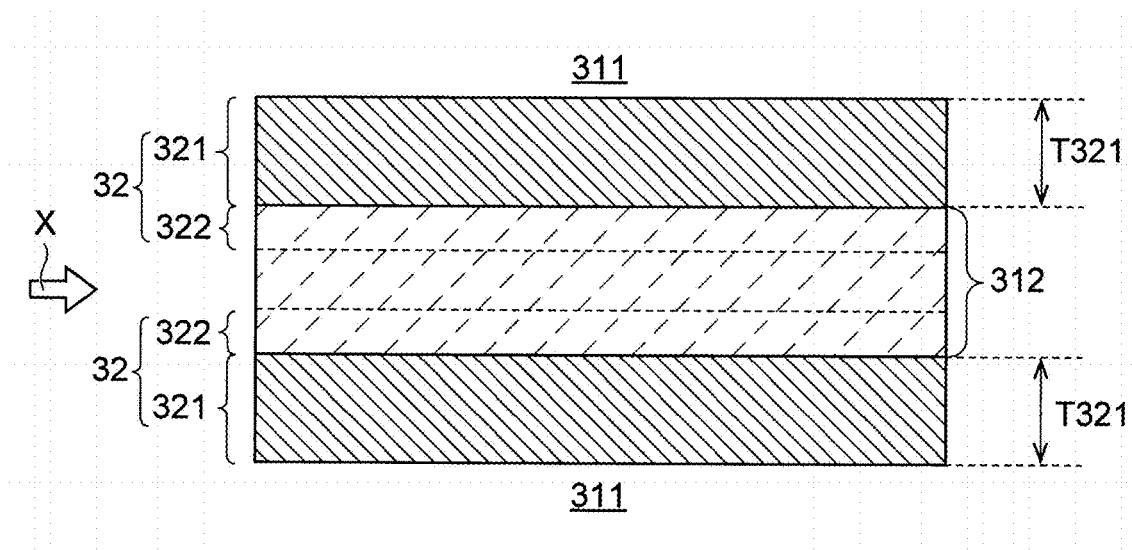
FIG. 3 is an enlarged view of the region R1 in FIG. 2.
Figure 4:
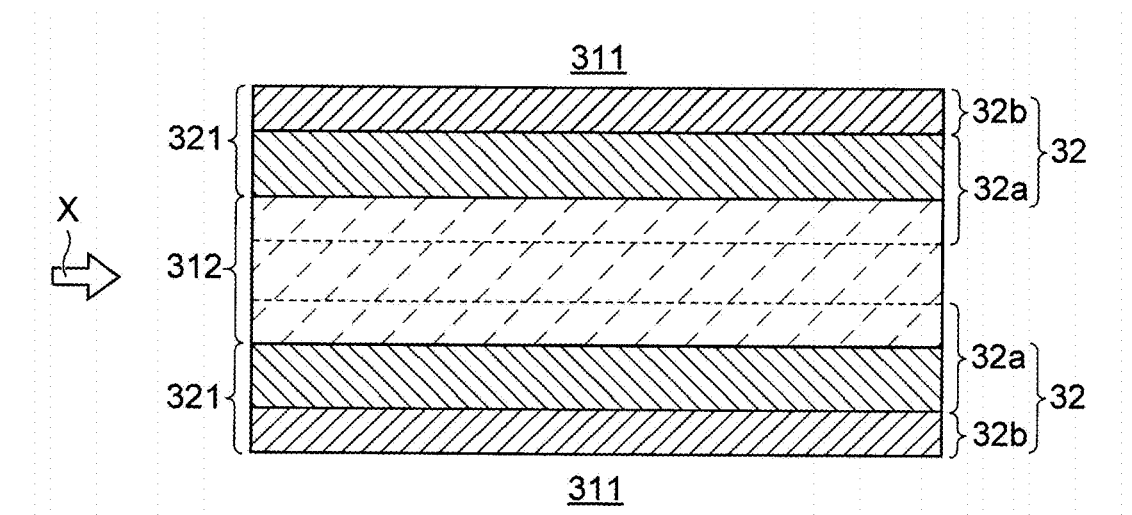
FIG. 4 is a cross-sectional view depicting one embodiment of a laminated structure of a catalyst layer.
Figure 5:
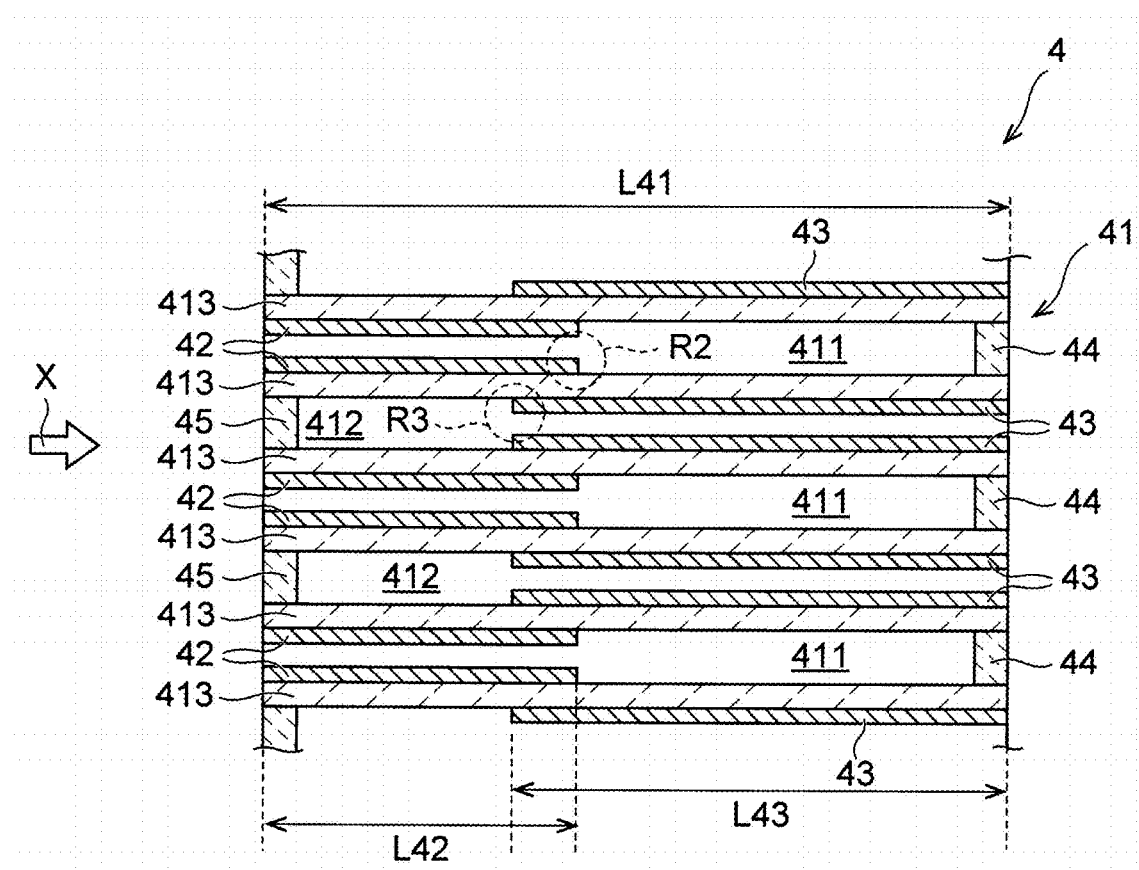
FIG. 5 is a cross-sectional view taken along the line B-B in FIG. 1.
Figure 6:
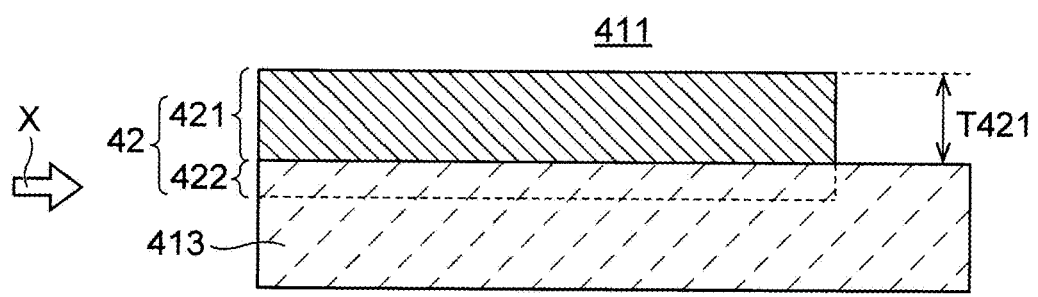
FIG. 6 is an enlarged view of the region R2 in FIG. 5.
Figure 7:
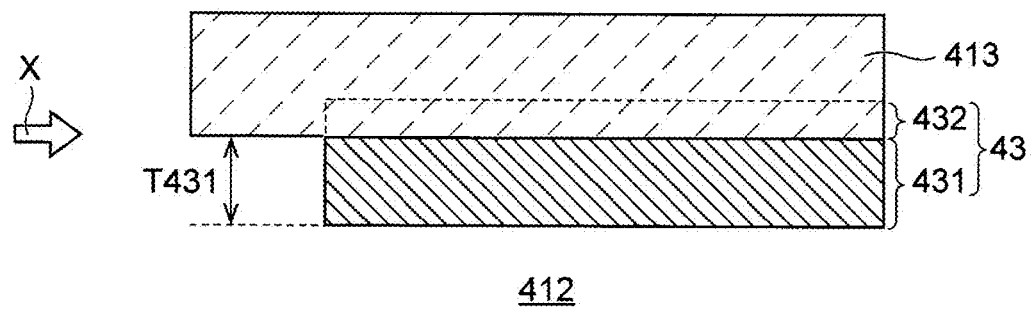
FIG. 7 is an enlarged view of the region R3 in FIG. 5.

Below, embodiments of an exhaust gas purification system according to the present invention will be described with reference to the drawings. FIG. 1 is a plan view of an exhaust gas purification system 1 according to one embodiment of the present invention; FIG. 2 is a cross-sectional view taken along the line A-A in FIG. 1 (a cross-sectional view of a first exhaust gas treatment section 3 included in the exhaust gas purification system 1); FIG. 3 is an enlarged view of the region R1 in FIG. 2; FIG. 4 is a cross-sectional view depicting one embodiment of a laminated structure of a catalyst layer; FIG. 5 is a cross-sectional view taken along the line B-B in FIG. 1 (a cross-sectional view of a second exhaust gas treatment section 4 included in the exhaust gas purification system 1); FIG. 6 is an enlarged view of the region R2 in FIG. 5; and FIG. 7 is an enlarged view of the region R3 in FIG. 5.

The exhaust gas purification system 1 according to one embodiment of the present invention, disposed in an exhaust pathway of an internal-combustion engine, removes harmful components such as HC, CO, and NOx from exhaust gas emitted from the internal-combustion engine, and collects particulate matter from the exhaust gas. The internal-combustion engine is, for example, a gasoline engine (for example, a GDI engine).

As shown in FIG. 1, the exhaust gas purification system 1 includes an exhaust pipe 2, a first exhaust gas treatment section 3 provided upstream in the exhaust pipe 2, and a second exhaust gas treatment section 4 provided downstream in the exhaust pipe 2. The first exhaust gas treatment section 3 corresponds to a catalyst converter, and the second exhaust gas treatment section 4 corresponds to a GPF.

One end 21 of the exhaust pipe 2 is connected to the internal-combustion engine, and exhaust gas emitted from the internal-combustion engine flows through the exhaust pipe 2 from the one end 21 of the exhaust pipe 2 toward the other end 22. In other words, the exhaust pipe 2 forms an exhaust gas path through which the exhaust gas flows. In each drawing, the exhaust gas flow direction is denoted by the reference sign X. The exhaust gas flowing into the exhaust pipe 2 is supplied to the first exhaust gas treatment section 3 provided upstream in the exhaust pipe 2, and treated in the first exhaust gas treatment section 3. The exhaust gas that has passed through the first exhaust gas treatment section 3 is supplied to the second exhaust gas treatment section 4 provided downstream in the exhaust pipe 2, and treated in the second exhaust gas treatment section 4.

In the present description, the upstream position in the exhaust gas flow direction X is referred to as the "exhaust gas inflow side", and the downstream position in the exhaust gas flow direction X is referred to as the "exhaust gas outflow side", in some cases. Additionally, in the present description, the "length" means a dimension in the direction parallel to the exhaust gas flow direction X, unless otherwise specified. The "thickness" means a dimension in the direction perpendicular to the exhaust gas flow direction X, unless otherwise specified.

<<First Exhaust Gas Treatment Section>>

The first exhaust gas treatment section 3 will now be described.

As shown in FIG. 2, the first exhaust gas treatment section 3 includes a flow-through type substrate 31 and first catalyst layers 32.

<Flow-Through Type Substrate>

The flow-through type substrate 31 will now be described.

The flow-through type substrate 31 can be made of any material selected as appropriate from materials commonly used for forming substrates of exhaust gas purification catalysts. The material for forming the flow-through type substrate 31 is preferably a material that allows the flow-through type substrate 31 to stably maintain its shape even when the flow-through type substrate 31 is exposed to an exhaust gas having a high temperature (for example, 400° C. or more). Examples of materials for the flow-through type substrate 31 include: ceramics such as cordierite, silicon carbide (SIC), and aluminum titanate; alloys such as stainless steel; and the like.

The flow-through type substrate 31 has, for example, a honeycomb structure.

As shown in FIG. 2, the flow-through type substrate 31 includes cells 311 and a partition wall 312 separating the cells 311 from one another. In the flow-through type substrate 31, the partition wall 312 is present between two adjacent cells 311, whereby the two adjacent cells 311 are separated from each other by the partition wall 312. The flow-through type substrate 31 includes a tubular member (not shown) that defines the external shape of the flow-through type substrate 31. The partition wall 312 is formed in the tubular member. The tubular member has, for example, a hollow cylindrical shape, but may have another shape. Examples of the other shape include a hollow elliptic cylindrical shape, a polygonal tubular shape and the like. The axial direction of the flow-through type substrate 31 is coincident with the axial direction of the tubular member. The flow-through type substrate 31 is disposed so that the axial direction of the tubular member can be generally coincident with the exhaust gas flow direction X.

As shown in FIG. 2, recesses each having an open end on the exhaust gas inflow side and an open end on the exhaust gas outflow side are formed in the flow-through type substrate 31. The spaces in these recesses form the cells 311.

As shown in FIG. 2, the cells 311 each extend in the exhaust gas flow direction X, and each have an end on the exhaust gas inflow side in the exhaust gas flow direction X and an end on the exhaust gas outflow side in the exhaust gas flow direction X. As shown in FIG. 2, the end on the exhaust gas inflow side in the exhaust gas flow direction X and the end on the exhaust gas outflow side in the exhaust gas flow direction X are both open. Hereinafter, the end on the exhaust gas inflow side of each cell 311 may be referred to as "the opening on the exhaust gas inflow side of each cell 311", and the end on the exhaust gas outflow side of each cell 311 may be referred to as "the opening on the exhaust gas outflow side of each cell 311".

Examples of the shape in a plan view of the opening on the exhaust gas inflow or outflow side of each cell 311 (the shape when the flow-through type substrate 31 is viewed in a plan view from the exhaust gas inflow or outflow side in the exhaust gas flow direction X) include various geometric shapes, including: rectangles such as parallelograms, rectangles and trapezoids; polygons such as triangles, hexagons and octagons; and circles and ovals.

The area of the shape in a plan view of the opening on the exhaust gas inflow side of each cell 311 may be the same as or different from the area of the shape in a plan view of the opening on the exhaust gas outflow side of each cell 311.

The density of the cells 311 can be adjusted suitably, considering the pressure loss, the collection efficiency of particulate matter, and the like. The smaller the density of the cells 311 is, the larger the area of the openings on the exhaust gas inflow side of the cells 311 is. This results in a decrease in the pressure loss, and a decrease in the collection efficiency of particulate matter. Accordingly, the density of the cells 311 per square inch of the flow-through type substrate 31 is preferably 400 cells or more and 1200 cells or less, more preferably 600 cells or more and 900 cells or less. The density of the cells 311 per square inch of the flow-through type substrate 31 means the total number of the cells 311 per square inch of the flow-through type substrate 31 observed from the exhaust gas inflow or outflow side in the exhaust gas flow direction X.

The volume of the flow-through type substrate 31 is preferably 0.7 L or more and 1.6 L or less, more preferably 0.8 L or more and 1.2 L or less. Adjusting the volume of the flow-through type substrate 31 within these ranges makes it possible that a cerium-element-containing inorganic oxide contained in each of the first catalyst layers 32 exhibits the oxygen storage capacity more suitably. The volume of the flow-through type substrate 31 means the apparent volume of the flow-through type substrate 31 (in other words, the whole volume of the flow-through type substrate 31 including the cells 311 and the partition wall 312). In the case where the flow-through type substrate 31 has a hollow cylindrical shape, the volume of the flow-through type substrate 31 can be calculated according to the following equation, assuming that the external diameter of the tubular member defining the external shape of the flow-through type substrate 31 is 2r, and that the length of the flow-through type substrate 31 is $L_{31}$.

$$\text{Volume of flow-through type substrate } 31 = \pi \times r^2 \times L_{31}$$

The thickness of the partition wall 312 is, for example, 54 μm or more and 73 μm or less. The thickness of the partition wall 312 can be determined by the same method as the method for calculating the thicknesses of catalyst layers to be described later.

<First Catalyst Layers>

The first catalyst layers 32 will now be described.

As shown in FIGS. 2 and 3, the first catalyst layers 32 each include a portion 321 that is formed on the surface of the partition wall 312. Specifically, the first catalyst layers 32 each include a portion 321 that is formed on the surface of the partition wall 312, and extends from the end on the exhaust gas inflow side of the partition wall 312 to the end on the exhaust gas outflow side of the partition wall 312 along the exhaust gas flow direction X. The phase "the surface of the partition wall 312" refers to the outer surface, which defines the external shape of the partition wall 312. The phase "a portion that is formed on the surface of the partition wall 312" refers to a portion rising from the outer surface of the partition wall 312 toward the cell 311 side.

As shown in FIG. 3, the first catalyst layers 32 may each include a portion 322 that is present inside the partition wall 312, in addition to the portion 321. For example, in the case where the partition wall 312 is porous, the portion 322 is usually formed in addition to the portion 321, during the formation of the first catalyst layers 32. The region in which the portion 321 is present does not overlap with the region in which the partition wall 312 is present, while the region in which the portion 322 is present overlaps with the region in which the partition wall 312 is present. Therefore, the portion 321 and the portion 322 can be identified by cutting each of the first catalyst layers 32 and analyzing the resulting cross-section by cross-sectional observation or the like using a scanning electron microscope (SEM), electron probe microanalyzer (EPMA), or the like, and identifying the portion 321 and the portion 322 in terms of composition, form, and the like. At the time of observing the cross section, element mapping of the cross section may be performed. The element mapping can be performed, for example, using a combination of a cross-sectional observation by SEM and a compositional analysis of the cross-section. The element mapping can be performed, for example, using a scanning electron microscope-energy dispersive X-ray spectrometer (SEM-EDX), an electron probe microanalyzer (EPMA), transmission X-RAY inspection apparatus, or the like. By performing the element mapping of the cross-section, the portion 321 and the portion 322 can be identified, based on the difference in form and composition between the partition wall 312 and each of the first catalyst layers 32.

The amount of the first catalyst layers 32 can be adjusted suitably, considering the thermal endurance of the first catalyst layers 32 and the pressure loss in the first exhaust gas treatment section 3. From the viewpoint of enhancing the thermal endurance of the first catalyst layers 32, the amount of the first catalyst layers 32 is preferably larger, but, as the amount increases, the area of the openings on the exhaust gas inflow side of the cells 311 decreases, and the pressure loss increases. Accordingly, the mass (the mass after drying and calcining) of the first catalyst layers 32 per unit volume of the flow-through type substrate 31 is preferably 135 g/L or more and 320 g/L or less, more preferably 150 g/L or more and 270 g/L or less, still more preferably 190 g/L or more and 240 g/L or less. The volume of the flow-through type substrate 31 means the apparent volume of the flow-through type substrate 31.

One example of the method of calculating the mass of the first catalyst layers 32 per unit volume of the flow-through type substrate 31 will now be described.

A sample extending in the axial direction of the flow-through type substrate 31 and having the same length as the length $L_{31}$ of the flow-through type substrate 31 is cut out from the first exhaust gas treatment section 3, and the sample is cut in a plane perpendicular to the axial direction of the flow-through type substrate 31, to prepare a cut piece S1 which include a first catalyst layer 32. The cut piece S1 is, for example, in the form of a cylinder having a diameter of 25.4 mm and a length of 10 mm. The values of the diameter and length of the cut piece S1 can be changed as necessary. The length of the first catalyst layer 32 included in the cut piece S1 is identical to the length of the cut piece S1.

A cut piece of the flow-through type substrate 31 having the same size as that of the cut piece S1 is prepared. The cut piece of the flow-through type substrate 31 does not include a first catalyst layer 32.

The mass of the cut piece S1 and the mass of the cut piece of the flow-through type substrate 31 are measured, and the mass of the first catalyst layer 32 per unit volume of the cut piece S1 is calculated based on the following equation.

Mass of first catalyst layer 32 per unit volume of cut piece S1=((mass of cut piece S1)−(mass of cut piece of flow-through type substrate 31))/(volume of cut piece S1)

The volume of the cut piece S1 means the apparent volume of the cut piece S1. For example, in the case where the cut piece S1 is in the form of a cylinder having a diameter of 25.4 mm and a length of 10 mm, the volume of the cut piece S1 is $\pi \times (12.7 \text{ mm})^2 \times 10$ mm. The same applies to the volume of other cut pieces (e.g., cut pieces S2 and S3 to be described later).

The mass of the first catalyst layer 32 per unit volume of the cut piece S1 is calculated for three cut pieces S1 prepared from arbitrary locations of the first exhaust gas treatment section 3, and the mean value of the calculated values is defined as the mass of the first catalyst layers 32 per unit volume of the flow-through type substrate 31.

The mass of the first catalyst layer 32 per unit volume of the cut piece S1 may be calculated without using the cut piece of the flow-through type substrate 31. One example of such a calculation method is as follows. The mass and volume of the cut piece S1 are measured. The composition of the flow-through type substrate 31 included in the cut piece S1 is identified by an element mapping of a cross section of the cut piece S1. The composition of the cut piece S1 is identified by analysis using an inductively coupled plasma emission spectrophotometer or the like. Based on the thus identified compositions of the flow-through type substrate 31 and the cut piece S1, the proportion of the mass of the first catalyst layer 32 to the mass of the cut piece S1 is calculated. The mass of the first catalyst layer 32 per unit volume of the cut piece S1 is calculated based on the following equation.

Mass of first catalyst layer 32 per unit volume of cut piece S1=(mass of cut piece S1)×(proportion of mass of first catalyst layer 32 to mass of cut piece S1)/(volume of cut piece S1)

The first catalyst layers 32 each contain one or more catalytically-active components. The catalytically-active component(s) can be selected, for example, from noble metal elements such as platinum (Pt) element, palladium (Pd) element, rhodium (Rh) element, ruthenium (Ru) element, iridium (Ir) element, and osmium (Os) element, and is preferably selected from platinum (Pt) element, palladium (Pd) element, and rhodium (Rh) element from the viewpoint of enhancing the exhaust gas purification performance. A noble metal element is contained in each of the first catalyst layers 32 in a form capable of functioning as a catalytically-active component, for example, in a form of a noble metal, an alloy containing a noble metal element, a compound containing a noble metal element (e.g., an oxide of a noble metal element), or the like. The catalytically-active component(s) is/are preferably in a form of particles, from the viewpoint of enhancing the exhaust gas purification performance.

The first catalyst layers 32 each contain cerium (Ce) element. The cerium element contained in each of the first catalyst layers 32 is derived from a cerium-element-containing inorganic oxide. In other words, the first catalyst layers 32 each contain a cerium-element-containing inorganic oxide.

The cerium-element-containing inorganic oxide is an inorganic oxide in which the valence of the constituting element changes under the operating conditions of the exhaust gas purification catalyst, and has an oxygen storage capacity (OSC). The cerium-element-containing inorganic oxide is used, for example, in powder form. The cerium-element-containing inorganic oxide is preferably a porous material, because the catalytically-active component(s) can be more easily supported thereto. The BET specific surface area of the porous material is, for example, 50 to 150 m$^2$/g. The BET specific surface area is measured according to JIS R1626, "Measuring methods for the specific surface area of fine ceramic powders by gas adsorption using the BET method," "6.2 Flow method," "(3.5) Single-point method." In this method, a nitrogen-helium gas mixture containing 30% by volume of nitrogen as an adsorption gas and 70% by volume of helium as a carrier gas is used as a gas. "BELSORP-MR6" manufactured by MicrotracBEL Corp. is used as a measurement device.

Examples of the cerium-element-containing inorganic oxide include: cerium oxide ($CeO_2$); a complex oxide containing cerium (Ce) element and zirconium (Zr) element (hereinafter referred to as "$CeO_2$—$ZrO_2$-based complex oxide"); and the like. Among these, the $CeO_2$—$ZrO_2$-based complex oxide is preferable. In the $CeO_2$—$ZrO_2$-based complex oxide, $CeO_2$ and $ZrO_2$ preferably form a solid solution phase. In the $CeO_2$—$ZrO_2$-based complex oxide, $CeO_2$ and $ZrO_2$ may each form a single phase (a $CeO_2$ single phase or a $ZrO_2$ single phase) in addition to the solid solution phase. The formation of a solid solution phase by $CeO_2$ and $ZrO_2$ can be confirmed by detecting the formation of a single phase derived from $CeO_2$—$ZrO_2$ using an X-ray diffractometer (XRD).

A percentage $P_1$ of the mass of the cerium element contained in the first catalyst layers 32 in terms of cerium oxide ($CeO_2$), to the mass of the first catalyst layers 32, is 5.0% by mass or more and 13.0% by mass or less.

To allow rhodium element to sufficiently exhibit the catalytic activity (for example, NOx purification performance), it is desirable to bring the oxygen concentration of the exhaust gas within a given range. For example, in the case where the oxygen concentration of the exhaust gas is too high, rhodium element is oxidized excessively, thus decreasing the catalytic activity (for example, NOx purification performance) of the rhodium element. To allow rhodium element to sufficiently exhibit the catalytic activity, it is preferable that rhodium element is oxidized suitably. In the case where the oxygen concentration of the exhaust gas is too low, the oxidation of rhodium element is inhibited excessively, thus making the catalytic activity of the rhodium element insufficient. Accordingly, to favorably maintain the catalytic activity (for example, NOx purification performance) of the rhodium element contained in the second catalyst layers 42 in the second exhaust gas treatment section 4, it is desired to have a function for bringing, within a given range, the oxygen concentration of the exhaust gas supplied to the second exhaust gas treatment section 4 through the first exhaust gas treatment section 3. On the other hand, the oxygen concentration of the exhaust gas supplied to the second exhaust gas treatment section 4 through the first exhaust gas treatment section 3 is affected by the cerium-element-containing inorganic oxide contained in the first catalyst layers 32. The percentage $P_1$, being 5.0% by mass or more and 13.0% by mass or less, makes it possible that the oxygen concentration of the exhaust gas supplied to the second exhaust gas treatment section 4 through the first exhaust gas treatment section 3 is brought within a range that enables the sufficient expression of the catalytic activity (for example, NOx purification performance) of the rhodium element contained in the second catalyst layers 42 in the second exhaust gas treatment section 4. The details of the reason for this are not clear, but the following reason is conceivable. As the percentage $P_1$ increases, the oxygen storage capacity of the first catalyst layers 32 increases, and the range of variation in the oxygen concentration of the exhaust gas supplied to the second exhaust gas treatment section 4 through the first exhaust gas treatment section 3 decreases. In the case where the percentage $P_1$ is less than 5.0% by mass, the oxygen storage capacity of the first catalyst layers 32 is not sufficient, the range of variation in the oxygen concentration of the exhaust gas supplied to the second exhaust gas treatment section 4 through the first exhaust gas treatment section 3 is too large, and thus, in some cases, the rhodium element contained in the second catalyst layers 42 in the second exhaust gas treatment section 4 is oxidized excessively by the influence of the oxygen concentration of the exhaust gas supplied to the second exhaust gas treatment section 4 through the first exhaust gas treatment section 3, so that the catalytic activity (for example, NOx purification performance) of the rhodium element contained in the second catalyst layers 42 in the second exhaust gas treatment section 4 decreases. On the other hand, in the case where the percentage $P_1$ exceeds 13.0% by mass, the oxygen storage capacity of the first catalyst layers 32 is excessive, the range of variation in the oxygen concentration of the exhaust gas supplied to the second exhaust gas treatment section 4 through the first exhaust gas treatment section 3 is too small (in other words, the oxygen exchanged inside the first catalyst layers 32 increases, and the oxygen released from the first catalyst layers 32 and supplied to the second catalyst layers 42 in the second exhaust gas treatment section 4 decreases excessively), and thus, the rhodium element contained in the second catalyst layers 42 in the second exhaust gas treatment section 4 is oxidized insufficiently, so that the catalytic activity (for example, NOx purification performance) of the rhodium element contained in the second catalyst layers 42 in the second exhaust gas treatment section 4 is insufficient. The exchange of oxygen inside the first catalyst layers 32 can be generated, for example, because the oxygen released by an inorganic oxide particle is stored in another inorganic oxide particle.

Additionally, in the case where the first catalyst layers 32 each contain rhodium element, the catalytic activity (for example, NOx purification performance) of the rhodium element contained in the first catalyst layers 32 will undesirably be decreased by the influence of the oxygen concentration of the exhaust gas passing through the first exhaust gas treatment section 3. On the other hand, the oxygen concentration of the exhaust gas passing through the first exhaust gas treatment section 3 is affected by the cerium-element-containing inorganic oxide contained in the first catalyst layers 32. The percentage $P_1$, being 5.0% by mass or more and 13.0% by mass or less, makes it possible that the catalytic activity (for example, NOx purification performance) of the rhodium element contained in the first catalyst layers 32 is prevented from being decreased by the influence of the oxygen concentration of the exhaust gas passing through the first exhaust gas treatment section 3. The details of the reason for this are not clear, but the following reason is conceivable. As the percentage $P_1$ increases, the oxygen storage capacity of the first catalyst layers 32 increases. In the case where the percentage $P_1$ is less than 5.0% by mass, the oxygen storage capacity of the first catalyst layers 32 is insufficient, thus making it impossible that the catalytic activity (for example, NOx purification performance) of the rhodium element contained in the first catalyst layers 32 is prevented sufficiently from being decreased by the influence of the oxygen concentration of the exhaust gas passing through the first exhaust gas treatment section 3. On the other hand, in the case where the percentage $P_1$ exceeds 13.0% by mass, the oxygen storage capacity of the first catalyst layers 32 increases, the oxygen exchanged inside the first catalyst layers 32 increases, and the oxygen exchanged between the first catalyst layers 32 and the outside of the first catalyst layers 32 (the outside being the exhaust gas passing through the first exhaust gas treatment section 3) decreases excessively, so that the catalytic activity (for example, NOx purification performance) of the rhodium element contained in the first catalyst layers 32 is insufficient. The exchange of oxygen inside the first catalyst layers 32 can be generated, for example, because the oxygen released by an inorganic oxide particle is stored in another inorganic oxide particle.

The percentage $P_1$ is not particularly limited as long as the percentage is 5.0% by mass or more and 13.0% by mass or less. The percentage $P_1$ is preferably 6.0% by mass or more and 12.0% by mass or less, more preferably 7.0% by mass or more and 11.0% by mass or less, still more preferably 8.0% by mass or more and 10.0% by mass or less.

One example of the method of calculating the percentage $P_1$ will now be described.

A cut piece S1 is produced in the same manner as described above. The mass of the cerium element contained in the cut piece S1 is measured in terms of cerium oxide using a conventional method such as inductively coupled plasma-atomic emission spectroscopy (ICP-AES). The mass of the cerium element in terms of cerium oxide per unit volume of the cut piece S1 is calculated. Using three cut pieces S1 produced from arbitrary locations of the first exhaust gas treatment section 3, the mass of the cerium element in terms of cerium oxide per unit volume of each cut piece S1 is calculated, and the mean value of the calculated values is defined as the mass of the cerium element in terms of cerium oxide per unit volume of the flow-through type substrate 31. The percentage $P_1$ is calculated according to the following equation.

Percentage $P_1$=(mass of cerium element in terms of cerium oxide per unit volume of flow-through type substrate 31)/(mass of first catalyst layers 32 per unit volume of flow-through type substrate 31)×100

The amount of the cerium element contained in the $CeO_2$—$ZrO_2$-based complex oxide can be adjusted suitably, considering, for example, a balance between the oxygen storage capacity and the cost. From the viewpoint of, for example, a balance between the oxygen storage capacity and the cost, the amount of the cerium element contained in the $CeO_2$—$ZrO_2$-based complex oxide in terms of cerium oxide is preferably 5% by mass or more and 40% by mass or less, more preferably 5% by mass or more and 30% by mass or less, on the basis of the mass of the $CeO_2$—$ZrO_2$-based complex oxide. The amount of the cerium element contained in the $CeO_2$—$ZrO_2$-based complex oxide in terms of cerium oxide can be measured using a conventional method such as inductively coupled plasma-atomic emission spectroscopy (ICP-AES). The same method of measurement applies to the amount of another metal element contained in the $CeO_2$—$ZrO_2$-based complex oxide in terms of metal oxide.

The amount of the zirconium element contained in the $CeO_2$—$ZrO_2$-based complex oxide can be adjusted suitably, considering, for example, a balance between the heat resistance and the cost. From the viewpoint of, for example, a balance between the heat resistance and the cost, the amount of the zirconium element contained in the $CeO_2$—$ZrO_2$-based complex oxide in terms of zirconium oxide is preferably 50% by mass or more and 90% by mass or less, more preferably 55% by mass or more and 80% by mass or less, on the basis of the mass of the $CeO_2$—$ZrO_2$-based complex oxide.

From the viewpoint of, for example, a balance between the oxygen storage capacity and the heat resistance, the ratio of the amount of the zirconium element contained in the $CeO_2$—$ZrO_2$-based complex oxide in terms of zirconium oxide to the amount of the cerium element contained in the $CeO_2$—$ZrO_2$-based complex oxide in terms of cerium oxide (the mass of the zirconium element in terms of zirconium oxide/the mass of the cerium element in terms of cerium oxide) is preferably 1.0 or more and 9.0 or less, more preferably 1.2 or more and 4.0 or less.

The $CeO_2$—$ZrO_2$-based complex oxide may contain a metal element other than cerium element and zirconium element. One or more metal elements other than cerium element and zirconium element, or oxides of the one or more metal elements may form a solid solution phase together with $CeO_2$ and/or $ZrO_2$, or may form a single phase. The formation of a solid solution phase by the one or more metal elements other than cerium element and zirconium element, or oxides thereof together with $CeO_2$ and/or $ZrO_2$ can be confirmed using an X-ray diffractometer (XRD), in the same manner as described above.

The one or more metal elements other than cerium element and zirconium element can be selected, for example, from rare earth elements other than cerium element, alkaline earth metal elements, and transition metal elements, and are preferably selected from rare earth elements other than cerium element.

In the $CeO_2$—$ZrO_2$-based complex oxide, the total amount of the one or more metal elements other than cerium element and zirconium element in terms of oxide is preferably 7% by mass or more and 20% by mass or less, more preferably 10% by mass or more and 15% by mass or less, on the basis of the mass of the $CeO_2$—$ZrO_2$-based complex oxide.

Examples of rare earth elements other than cerium element include yttrium (Y) element, praseodymium (Pr) element, scandium (Sc) element, lanthanum (La) element, neodymium (Nd) element, samarium (Sm) element, europium (Eu) element, gadolinium (Gd) element, terbium (Tb) element, dysprosium (Dy) element, holmium (Ho) element, erbium (Er) element, thulium (Tm) element, ytterbium (Yb) element, lutecium (Lu) element, and the like. Among these, a lanthanum element, neodymium element, praseodymium element, yttrium element, scandium element, and ytterbium element are preferable, and lanthanum element, neodymium element, and yttrium element are more preferable. An oxide of a rare earth element is a sesquioxide ($Ln_2O_3$, wherein Ln represents a rare earth element), excluding praseodymium element and terbium element. Praseodymium oxide is usually $Pr_6O_{11}$, and terbium oxide is usually $Tb_4O_7$.

Examples of alkaline earth metal elements include calcium (Ca) element, strontium (Sr) element, barium (Ba) element, radium (Ra) element, and the like. Among these, calcium element, strontium element, and barium element are preferable.

Examples of transition metal elements include manganese (Mn) element, iron (Fe) element, cobalt (Co) element, nickel (Ni) element, copper (Cu) element, and the like.

The first catalyst layers 32 preferably each contain an inorganic oxide other than the cerium-element-containing inorganic oxide (hereinafter referred to as "the other inorganic oxide"). The other inorganic oxide is used, for example, in powder form. The other inorganic oxide is preferably a porous material, because the catalytically-active component(s) can be more easily supported thereto. The BET specific surface area of the porous material is, for example, 50 to 150 $m^2/g$. Examples of the other inorganic oxide include alumina, silica, silica-alumina, alumino-silicates, alumina-zirconia, alumina-chromia, alumina-lanthana, and the like. Among these, alumina is preferable from the viewpoint of heat resistance.

The amount of the other inorganic oxide contained in the first catalyst layers 32 can be adjusted suitably, considering the thermal endurance of the first catalyst layers 32 and the pressure loss in the first exhaust gas treatment section 3. From the viewpoint of enhancing the thermal endurance of the first catalyst layers 32, the amount of the other inorganic oxide contained in the first catalyst layers 32 is preferably larger, but, as the amount increases, the area of the openings on the exhaust gas inflow side of the cells 311 decreases, and the pressure loss increases. Accordingly, the mass of the other inorganic oxide contained in the first catalyst layers 32 is preferably 86% by mass or more and 95% by mass or less, more preferably 88% by mass or more and 94% by mass or less, still more preferably 90% by mass or more and 92% by mass or less, on the basis of the mass of the first catalyst layers 32. Descriptions on the method of calculating a percentage of the mass of the other inorganic oxide contained in the first catalyst layers 32 to the mass of the first catalyst layers 32 are the same as the above descriptions on the method of calculating the percentage $P_1$.

The inorganic oxide other than the cerium-element-containing inorganic oxide may be modified with a cerium-element-containing inorganic oxide, or may support a cerium-element-containing inorganic oxide. For example, the outer surface of alumina or the like or the inner surface of pores of the alumina or the like may be modified with a cerium-element-containing inorganic oxide. The outer surface of alumina or the like or the inner surface of pores of the alumina or the like may support a cerium-element-containing inorganic oxide in a dispersed state.

From the viewpoint of efficiently achieving the exhaust gas purification performance of the catalytically-active component(s), the catalytically-active component(s) is/are preferably supported on the cerium-element-containing inorganic oxide and/or on the other inorganic oxide. The expression that "the catalytically-active component(s) is/are supported on an inorganic oxide" means a state in which the catalytically-active component(s) is/are physically or chemically adsorbed or retained on the outer surface, or the inner surface of the pores, of the inorganic oxide particle. For example, when an inorganic oxide and a catalytically-active component(s) are present in the same region in an element mapping analysis obtained by analyzing a cross section of a catalyst layer using an energy dispersive X-ray analyzer (EDX), it can be determined that the catalytic active component(s) is/are supported on the inorganic oxide.

The first catalyst layers 32 may each have a single-layer structure, or may each have a laminated structure. In the case where the first catalyst layers 32 each have a laminated structure, the composition of one layer may be the same as or different from that of another layer. For example, a catalytically-active component(s) contained in one layer may be the same as or different from a catalytically-active component(s) contained in another layer.

One embodiment of the laminated structure of each of the first catalyst layers 32 is shown in FIG. 4. As shown in FIG. 4, the first catalyst layers 32 may each have a two-layer structure composed of a lower layer 32a and an upper layer 32b. The lower layer 32a is a layer located on the side of the partition wall 312 compared to the upper layer 32b.

In the case where the first catalyst layers 32 each have a laminated structure, the portion 321 of each of the first catalyst layers 32 may be formed of the entirety or a part of one layer, or may be formed of the entirety of one or more layers and the entirety or a part of another one layer. For example, when the first catalyst layers 32 each have a two-layer structure, the portion 321 of each of the first catalyst layers 32 may be formed of the entirety or a part of the upper layer, or may be formed of the entirety of the upper layer and a part of the lower layer. In the embodiment shown in FIG. 4, the portion 321 of each of the first catalyst layers 32 is formed of the entirety of the upper layer 32b and a part of the lower layer 32a.

In the embodiment shown in FIG. 4, the amounts of the lower layers 32a and the upper layers 32b provided in the flow-through type substrate 31 can be adjusted suitably, considering, for example, a balance between the exhaust gas purification performance and the cost. From the viewpoint of, for example, a balance between the exhaust gas purification performance and the cost, the mass of the lower layers 32a per unit volume of the flow-through type substrate 31 (the mass after drying and calcining) is preferably 90 g/L or more and 200 g/L or less, more preferably 110 g/L or more and 185 g/L or less, still more preferably 140 g/L or more and 175 g/L or less. The mass of the upper layers 32b per unit volume of the flow-through type substrate 31 (the mass after drying and calcining) is preferably 45 g/L or more and 120 g/L or less, more preferably 40 g/L or more and 90 g/L or less, still more preferably 50 g/L or more and 66 g/L or less. The volume of the flow-through type substrate 31 is the apparent volume of the whole flow-through type substrate 31.

In the embodiment shown in FIG. 4, the lower layers 32a and the upper layers 32b each contain one or more catalytically-active components. The catalytically-active component(s) contained in each of the lower layers 32a is/are preferably different from the catalytically-active component(s) contained in each of the upper layers 32b. For example, the catalytically-active component contained in each of the lower layers 32a is palladium element, and the catalytically-active component contained in each of the upper layers 32b is a noble metal element (for example, rhodium element) other than palladium element. Coating the lower layer 32a containing palladium element with the upper layer 32b makes it possible to decrease the phosphorus poisoning of the palladium element contained in the lower layer 32a (a decrease caused in the catalytic activity of the palladium element by phosphorus contained in the exhaust gas).

In the embodiment shown in FIG. 4, the lower layers 32 and/or the upper layers 32b each contain the cerium-element-containing inorganic oxide. In one embodiment, the lower layers 32a each contain the cerium-element-containing inorganic oxide, and the upper layers 32b do not contain the cerium-element-containing inorganic oxide. In another embodiment, the lower layers 32a do not contain the cerium-element-containing inorganic oxide, and the upper layers 32b each contain the cerium-element-containing inorganic oxide. In yet another embodiment, the lower layers 32a and the upper layers 32b each contain the cerium-element-containing inorganic oxide. In any one of the embodiments, the percentage $P_1$ of the mass of the cerium element contained in the first catalyst layers 32 (the upper layers 32a and the lower layers 32b) in terms of cerium oxide, to the mass of the first catalyst layers 32 (the upper layers 32a and the lower layers 32b), is 5.0% by mass or more and 13.0% by mass or less.

The amount of the cerium-element-containing inorganic oxide contained in the lower layers 32a can be adjusted suitably, considering the oxygen storage capacity and the pressure loss in the first exhaust gas treatment section 3. From the viewpoint of enhancing the oxygen storage capacity, the amount of the cerium-element-containing inorganic oxide contained in the lower layers 32a is preferably larger, but, as the amount increases, the area of the openings of the exhaust gas inflow side of the cells 311 decreases, and the pressure loss increases. Accordingly, the percentage of the mass of the cerium element contained in the lower layers 32a in terms of cerium oxide, to the mass of the lower layers 32a, is preferably 7% by mass or more and 12% by mass or less, more preferably 10% by mass or more and 12% by mass or less.

From the same viewpoint as in the lower layers 32a, the amount of the cerium-element-containing inorganic oxide contained in the upper layers 32b can be adjusted suitably, considering the oxygen storage capacity and the pressure loss in the first exhaust gas treatment section 3. The percentage of the mass of the cerium element contained in the upper layers 32b in terms of cerium oxide, to the mass of the upper layers 32b, is preferably 1% by mass or more and 7% by mass or less, more preferably 3% by mass or more and 7% by mass or less.

As shown in FIG. 4, in the case where the first catalyst layers 32 each have a two-layer structure composed of the lower layer 32a and the upper layer 32b, the lower layer 32a and the upper layer 32b each preferably contain another inorganic oxide.

The amount of the other inorganic oxide contained in the lower layers 32a can be adjusted suitably, considering the thermal endurance of the lower layers 32a and the pressure loss in the first exhaust gas treatment section 3. From the viewpoint of enhancing the thermal endurance of the lower layers 32a, the amount of the other inorganic oxide contained in the lower layers 32a is preferably larger, but, as the amount increases, the area of the opening on the exhaust gas inflow side of the cells 311 decreases, and the pressure loss increases. Accordingly, the mass of the other inorganic oxide contained in the lower layers 32a is preferably 60% by mass or more and 76% by mass or less, more preferably 64% by mass or more and 72% by mass or less, on the basis of the mass of the lower layers 32a.

In the same viewpoint as in the lower layers 32a, the amount of the other inorganic oxide contained in the upper layers 32b can be adjusted suitably, considering the thermal endurance of the upper layers 32b and the pressure loss in the first exhaust gas treatment section 3. The mass of the other inorganic oxide contained in the upper layers 32b is preferably 33% by mass or more and 100% by mass or less, more preferably 33% by mass or more and 56% by mass or less, on the basis of the mass of the upper layers 32b.

One example of the method of forming the first catalyst layers 32 will now be described.

A flow-through type substrate 31 and a slurry for forming the first catalyst layers 32 are prepared. In the case where each of the first catalyst layers 32 has a laminated structure, two or more kinds of slurries are prepared as the slurry for forming the first catalyst layers 32.

The composition of the slurry for forming the first catalyst layers 32 is adjusted depending on the composition of the first catalyst layers 32. The slurry contains, for example, a supply source of a noble metal element, inorganic oxide particles, a binder, a pore forming agent, a solvent, or the like. The supply source of a noble metal element may be, for example, a salt of a noble metal element, and examples of the salt of a noble metal element include nitrates, ammine complex salts, acetates, and chlorides. Examples of an inorganic oxide constituting inorganic oxide particles include a cerium-element-containing inorganic oxide, another inorganic oxide, and the like. Descriptions on the cerium-element-containing inorganic oxide and the other inorganic oxide are the same as described above. Examples of the binder include alumina sol, zirconia sol, titania sol and silica sol. Examples of the pore forming agent include cross-linked polymethyl (meth)acrylate particles, cross-linked polybutyl (meth)acrylate particles, cross-linked polystyrene particles, cross-linked polyacrylate particles and melamine-based resins. Examples of the solvent include water and organic solvents. Examples of the organic solvent include alcohol, acetone, dimethyl sulfoxide and dimethylformamide. One kind of solvent may be used, or two or more kinds of solvents may be used as a mixture.

The slurry for forming the first catalyst layers 32 is applied to the flow-through type substrate 31, dried, and calcined if desired. These operations are repeated in the case where the first catalyst layers 32 each have a laminated structure. In this manner, precursor layers of the first catalyst layers 32 are formed. It is possible to adjust the length of the precursor layers of the first catalyst layers 32 (eventually, the length of the first catalyst layers 32) by adjusting the solid concentration, viscosity, and the like of the slurry. In addition, by adjusting the coating amount of the slurry, the types of the materials for forming the slurry, the particle size of the pore forming agent contained in the slurry, and the like, it is possible to adjust the thickness of the precursor layers of the first catalyst layers 32 (eventually, the thickness of the first catalyst layers 32), and the mass of the precursor layers of the first catalyst layers 32 (eventually, the mass of the first catalyst layers 32). The drying temperature is usually 70° C. or more and 200° C. or less, preferably 90° C. or more and 150° C. or less. The drying time is usually 1 hour or more and 3 hours or less, preferably 1.5 hours or more and 2 hours or less.

The particle size of the pore forming agent can be adjusted as appropriate. However, the median $D_{50}$ of the pore forming agent is usually 5 μm or more and 50 μm or less, preferably 10 μm or more and 30 μm or less, from the viewpoint of reducing delamination, reducing pressure drop, and improving the PM collecting performance, and the like. The larger the particle size of the pore forming agent is, the larger the thickness of the first catalyst layers 32 becomes. The $D_{50}$ is the particle size at which the cumulative volume reaches 50%, in a particle size distribution based on volume as measured by the laser diffraction scattering particle size distribution measurement method. The $D_{50}$ is measured, for example, by: introducing the pore forming agent into an aqueous dispersion medium, using an automatic sample feeder ("Microtorac SDC" manufactured by MicrotracBEL Corporation) for a laser diffraction scattering particle size distribution analyzer, irradiating a 40-W ultrasonic wave for 360 seconds in a flow velocity of 26 mL/sec, followed by measurement using a laser diffraction scattering particle size distribution analyzer (manufactured by MicrotracBEL Corporation "Microtrac MT3300EXII"). The measurement is carried out twice, under the conditions of particle refractive index: 1.5, particle shape: "true sphere", solvent refractive index: 1.3, "set-zero": 30 seconds, and measurement time: 30 seconds, and the mean value of the measured values is defined as $D_{50}$. Pure water is used as the aqueous dispersion medium.

The slurry for forming the first catalyst layers 32 can be applied, for example, by dipping the whole flow-through type substrate 31 in the slurry for forming the first catalyst layers 32, or by dipping the end on the exhaust gas inflow or outflow side of the flow-through type substrate 31 in the slurry for forming the first catalyst layers 32, and sucking the slurry from the opposite side.

After the formation of the precursor layers of the first catalyst layers 32, the resulting substrate is calcined. In this manner, the first catalyst layers 32 are formed. The calcination temperature is usually 450° C. or higher and 700° C. or lower, preferably 450° C. or higher and 600° C. or lower. The calcination time is usually 1 hour or more and 4 hours or less, preferably 1.5 hours or more and 2 hours or less. The calcination can be carried out, for example, in an air atmosphere.

<<Second Exhaust Gas Treatment Section>>

The second exhaust gas treatment section 4 will now be described.

As shown in FIG. 5, the second exhaust gas treatment section 4 includes a wall-flow type substrate 41, second catalyst layers 42, and third catalyst layers 43.

<Wall-Flow Type Substrate>

The wall-flow type substrate 41 will now be described.

The wall-flow type substrate 41 can be made of any material selected as appropriate from materials commonly used for forming substrates of exhaust gas purification catalysts. Examples of materials for the wall-flow type substrate 41 include the same materials as the abovementioned materials for the flow-through type substrate 31.

As shown in FIG. 5, the wall-flow type substrate 41 includes inflow-side cells 411, outflow-side cells 412, and a porous partition wall 413 separating the inflow-side cells 411 and the outflow-side cells 412 from one another. In the wall-flow type substrate 41, a plurality of (for example, four) outflow-side cells 412 are arranged around and adjacent to one inflow-side cell 411, and the inflow-side cell 411 and the outflow-side cells 412 adjacent to the inflow-side cell 411 are separated from one another by the porous partition wall 413. The wall-flow type substrate 41 includes a tubular member (not shown) that defines the external shape of the wall-flow type substrate 41. The partition wall 413 is formed inside the tubular member. The tubular member has, for example, a hollow cylindrical shape, but may have another tubular shape. Examples of the other tubular shape include a hollow elliptic cylindrical shape, a polygonal tubular shape and the like. The axial direction of the wall-flow type substrate 41 is coincident with the axial direction of the tubular member. The wall-flow type substrate 41 is disposed so that the axial direction of the tubular member can be generally coincident with the exhaust gas flow direction X.

As shown in FIG. 5, recesses each having an open end on the exhaust gas inflow side, and recesses each having an open end on the exhaust gas outflow side are formed in the wall-flow type substrate 41. The space inside each recess having an open end on the exhaust gas inflow side forms each inflow-side cell 411. The space inside each recess having an open end on the exhaust gas outflow side forms each outflow-side cell 412.

As shown in FIG. 5, each inflow-side cell 411 extends in the exhaust gas flow direction X, and has an end on the exhaust gas inflow side and an end on the exhaust gas outflow side. As shown in FIG. 5, the end on the exhaust gas inflow side of each inflow-side cell 411 is open, and the end on the exhaust gas outflow side of each inflow-side cell 411 is closed. The end on the exhaust gas inflow side of each inflow-side cell 411 is sometimes referred to as "the opening of each inflow-side cell 411".

As shown in FIG. 5, the wall-flow type substrate 41 is provided with a first sealing member 44 that seals the end on the exhaust gas outflow side of each inflow-side cell 411, whereby the end on the exhaust gas outflow side of each inflow-side cell 411 is closed by the first sealing member 44.

As shown in FIG. 5, each outflow-side cell 412 extends in the exhaust gas flow direction X, and has an end on the exhaust gas inflow side and an end on the exhaust gas outflow side. As shown in FIG. 5, the end on the exhaust gas inflow side of each outflow-side cell 412 is closed, and the end on the exhaust gas outflow side of each outflow-side cell 412 is open. The end on the exhaust gas outflow side of each outflow-side cell 412 is sometimes referred to as "the opening of each outflow-side cell 412".

As shown in FIG. 5, the wall-flow type substrate 41 is provided with a second sealing member 45 that seals the end on the exhaust gas inflow side of each outflow-side cell 412, whereby the end on the exhaust gas inflow side of each outflow-side cell 412 is closed by the second sealing member 45.

Examples of the shape in a plan view of the opening of each inflow-side cell 411 or each outflow-side cell 412 (the shape when the wall-flow type substrate 41 is viewed in a plan view from the exhaust gas inflow or outflow side in the exhaust gas flow direction X) include various geometric shapes such as: quadrangles such as parallelograms, rectangles, and trapezoids; triangles such as equilateral triangles; hexagons such as regular hexagons; octagons such as regular octagons; polygons such as squares; circles; and ovals.

The area of the shape in a plain view of the opening of each inflow-side cell 411 may be the same as or different from the area of the shape in a plain view of the opening of each outflow-side cell 412.

The density of the inflow-side cells 411 and the outflow-side cells 412 can be adjusted suitably, considering the pressure loss, the collection efficiency of particulate matter, and the like. The smaller the density of the inflow-side cells 411 and the outflow-side cells 412 is, the larger the area of the openings of the inflow-side cells 411 is. This results in a decrease in the pressure loss, and a decrease in the collection efficiency of particulate matter. Accordingly, the density of the inflow-side cells 411 and the outflow-side cells 412 per square inch of the wall-flow type substrate 41 is preferably 200 cells or more and 400 cells or less, more preferably 200 cells or more and 300 cells or less. The density of the inflow-side cells 411 and outflow-side cells 412 per square inch of the wall-flow type substrate 41 means the total number of the inflow-side cells 411 and the outflow-side cells 412 per square inch of a cross-section obtained by cutting the wall-flow type substrate 41 by a plane perpendicular to the exhaust gas flow direction X.

The volume of the wall-flow type substrate 41 is preferably 1.0 L or more and 2.2 L or less, more preferably 1.3 L or more and 1.7 L or less. Adjusting the volume of the wall-flow type substrate 41 within these ranges makes it possible that, in the case where each of the second catalyst layers 42 and/or each of the third catalyst layers 43 contain(s) a cerium-element-containing inorganic oxide, the cerium-element-containing inorganic oxide achieves the oxygen storage capacity more suitably. The volume of the wall-flow type substrate 41 means the apparent volume of the wall-flow type substrate 41 (in other words, the volume of the whole wall-flow type substrate 41 including the inflow-side cells 411, the outflow-side cells 412, the partition wall 413, the first sealing member 44, and the second sealing member 45). In the case where the wall-flow type substrate 41 has a hollow cylindrical shape, the volume of the wall-flow type substrate 41 can be calculated according to the following equation, assuming that the external diameter of the tubular member defining the external shape of the wall-flow type substrate 41 is 2r, and that the length of the wall-flow type substrate 41 is $L_{41}$.

Volume of wall-flow type substrate $41 = \pi \times r^2 \times L_{41}$

The partition wall 413 has a porous structure through which exhaust gas can pass. The partition wall 413 has a thickness of, for example, 200 μm or more and 280 μm or less. The thickness of the partition wall 413 can be determined by the same method as the method of calculating the thicknesses of catalyst layers to be described later.

<Second Catalyst Layers>

The second catalyst layers 42 will now be described.

As shown in FIG. 5 and FIG. 6, the second catalyst layers 42 each include a portion 421 that is formed on the surface on the inflow-side cell 411 side of the partition wall 413. Specifically, the second catalyst layers 42 each include a portion 421 that is formed on the surface on the inflow-side cell 411 side of the partition wall 413, and extends from the end on the exhaust gas inflow side of the partition wall 413 along the exhaust gas flow direction X. The phase "the surface on the inflow-side cell 411 side of the partition wall 413" refers to the outer surface on the inflow-side cell 411 side of the partition wall 413, which defines the external shape of the partition wall 413. The phase "a portion that is formed on the surface on the inflow-side cell 411 side of the partition wall 413" refers to a portion rising from the outer surface on the inflow-side cell 411 side of the partition wall 413 toward the inflow-side cell 411 side.

In the case where the second catalyst layers 42 each include the portion 421 that is formed on the surface on the inflow-side cell 411 side of the partition wall 413, the exhaust gas supplied to the second exhaust gas treatment section 4 through the first exhaust gas treatment section 3 easily comes in contact with the rhodium element contained in the second catalyst layers 42. This allows the rhodium element contained in the second catalyst layers 42 to efficiently exhibit the catalytic activity.

As shown in FIG. 6, the second catalyst layers 42 may each include a portion 422 that is present inside the partition wall 413, in addition to the portion 421. Since the partition wall 413 is porous, the portion 422 is usually formed in addition to the portion 421, during the formation of the second catalyst layers 42. The region in which the portion 421 is present does not overlap with the region in which the partition wall 413 is present, while the region in which the portion 422 is present overlaps with the region in which the partition wall 413 is present. Therefore, the portion 421 and the portion 422 can be identified by cutting each of the second catalyst layers 42 and analyzing the resulting cross-section by cross-sectional observation or the like using a scanning electron microscope (SEM), electron probe microanalyzer (EPMA), or the like, and identifying the portion 421 and the portion 422 in terms of composition, form, and the like. At the time of observing the cross section, element mapping of the cross section may be performed. The element mapping can be performed in the same manner as described above. By performing the element mapping of the cross section, the portion 421 and the portion 422 can be identified, based on the difference in form and composition between the partition wall 413 and each of the second catalyst layers 42.

The second catalyst layers 42 are formed on the inflow-side cell 411 side in the wall-flow type substrate 41. Whether the second catalyst layers 42 are formed on the inflow-side cell 411 side in the wall-flow type substrate 41 can be judged by whether the portions 421 of the second catalyst layers 42 have a predetermined thickness.

The portions 421 preferably have a suitable thickness from the viewpoint of improving the efficiency of contact between the exhaust gas supplied to the second exhaust gas treatment section 4 through the first exhaust gas treatment section 3 and the rhodium element contained in the second catalyst layers 42. The thickness $T_{421}$ of the portions 421 of the second catalyst layers 42 is preferably 15 μm or more and 55 μm or less, more preferably 25 μm or more and 45 μm or less, still more preferably 30 μm or more and 40 μm or less.

One example of the method of calculating the thickness $T_{421}$ of the portions 421 of the second catalyst layers 42 will now be described.

The second exhaust gas treatment section 4 is cut in a plane perpendicular to the axial direction of the wall-flow type substrate 41 (for example, at a position 10 mm away from the end on the exhaust gas inflow side of the wall-flow type substrate 41 in the exhaust gas flow direction X), and a second catalyst layer 42 existing in one inflow-side cell 411 arbitrarily selected from the resulting cross section is observed using a scanning electron microscope (SEM), to identify the region in which the partition wall 413 of the wall-flow type substrate 41 is present and the region in which the second catalyst layer 42 is present. In the cross-sectional observation by SEM, the field magnification is, for example, 300 times, and the full field width (length in the direction perpendicular to the axial direction of the wall-flow type substrate 41) is, for example, from 500 to 600 μm. The region to be observed by SEM is selected so as not to include any of the corners of the inflow-side cell 411. The region in which the partition wall 413 of the wall-flow type substrate 41 is present and the region in which the second catalyst layer 42 is present can be identified based on the difference in form between the partition wall 413 of the wall-flow type substrate 41 and the second catalyst layer 42. At this time, element mapping of the cross section may be performed. The element mapping can be performed in the same manner as described above. By performing the element mapping of the cross section, the region in which the partition wall 413 of the wall-flow type substrate 41 is present and the region in which the second catalyst layer 42 is present can be identified based on the difference in form and composition between the second catalyst layer 42 and the partition wall 413 of the wall-flow type substrate 41.

In the SEM observation image, the first to the N-th grid lines parallel to the thickness direction of the partition wall 413 of the wall-flow type substrate 41 are drawn at 15 μm intervals, sequentially from the left end side or the right end side of the image, and the intersections of the outline of the region in which the partition wall 413 of the wall-flow type substrate 41 is present and the respective grid lines are connected with straight lines, to identify the position of the surface of the partition wall 413 of the wall-flow type substrate 41. N is, for example, an integer from 30 to 50. In the same manner, the intersections of the outline of the region in which the second catalyst layer 42 is present and the respective grid lines are connected with straight lines, to identify the position of the surface of the second catalyst layer 42. In the case where the amount of change in the thickness direction from a certain intersection P1 to an intersection P2 adjacent to the intersection P1 exceeds the interval (15 μm) between two adjacent grid lines, it is preferred not to use the intersection P2 in the identification of the position of the surfaces (namely, to exclude the intersection P2 from the intersections to be connected with straight lines). The "amount of change in the thickness direction from a certain intersection P1 to an intersection P2 adjacent to the intersection P1" refers to the distance between the straight line that passes through the intersection P1 and is perpendicular to the thickness direction of the partition wall 413 of the wall-flow type substrate 41, and the straight line that passes through the intersection P2 and is perpendicular to the thickness direction of the partition wall 413 of the wall-flow type substrate 41. In the case where the amount of change in the thickness direction from the intersection P1 to the intersection P2 adjacent to the intersection P1 exceeds the interval (15 μm) between two adjacent grid lines, and the amount of change in the thickness direction from the intersection P1 to an intersection P3 adjacent to the intersection P2 also exceeds the interval (15 μm) between two adjacent grid lines, it is preferred not to use the intersection P3 in addition to the intersection P2 in the identification of the position of the surfaces (namely, to exclude the intersection P2 and the intersection P3 from the intersections to be connected with straight lines). When five successive intersections are excluded from the intersections to be connected with straight lines in such a manner, it is preferred not to perform the measurement of the thickness in this SEM image.

After identifying the position of the surface of the partition wall 413 of the wall-flow type substrate 41 and the position of the surface of the second catalyst layer 42, the area of the region surrounded by the second grid line, the (N−1)-th grid line, the surface of the partition wall 413 of the wall-flow type substrate 41 and the surface of the second catalyst layer 42, is determined, using image analysis software. For example, AreaQ (manufactured by S-Tech Corporation), ImageJ (public domain), Photoshop (manufactured by Adobe Systems Inc.) or the like can be used as the image analysis software. The first grid line and the N-th grid line are not used, because the image is more likely to be unclear at both ends thereof, making it difficult to identify the position of the surface of the partition wall 413 of the wall-flow type substrate 41 and the position of the surface of the second catalyst layer 42.

After determining the area of the above-described region, the thickness of the above-described region is calculated based on the following equation.

Thickness of the above-described region=area of the above-described region/(interval between grid lines×number of intervals between grid lines)

The interval between the grid lines is 15 μm, and the number of intervals between the grid lines is (N−3).

The thickness of the above-described region is calculated for 20 inflow-side cells 411 arbitrarily selected from the cross section, and the mean value of the measured thicknesses is defined as the thickness $T_{421}$ of the portions 421 of the second catalyst layers 42.

A percentage of the length $L_{42}$ of the second catalyst layers 42 to the length $L_{41}$ of the wall-flow type substrate 41 ($L_{42}/L_{41} \times 100$) is preferably 10% or more and 80% or less, more preferably 30% or more and 60% or less, still more preferably 40% or more and 50% or less.

One example of the method of calculating the length $L_{42}$ of the second catalyst layers 42 will now be described.

A sample extending in the axial direction of the wall-flow type substrate 41 and having the same length as the length $L_{41}$ of the wall-flow type substrate 41 is cut out from the second exhaust gas treatment section 4. The sample is, for example, in the form of a cylinder having a diameter of 25.4 mm. The value of the diameter of the sample can be changed, as necessary. The sample is cut at 5 mm intervals in planes perpendicular to the axial direction of the wall-flow type substrate 41 to obtain cut pieces, which are referred to as the first cut piece, the second cut piece and so on up to the n-th cut piece, sequentially from the side of the end on the exhaust gas inflow side of the sample. The length of each cut piece is 5 mm. The composition of each cut piece is analyzed using an X-ray fluorescence analyzer (XRF) (such as an energy dispersive X-ray spectrometer (EDX), a wavelength dispersive X-ray spectrometer (WDX) or the like), an inductively coupled plasma emission spectrophotometer (ICP-AES) or the like, and it is confirmed whether or not the cut piece includes a second catalyst layer 42, based on the composition of the cut piece.

The compositional analysis is not necessarily performed for a cut piece that apparently includes a second catalyst layer 42. For example, it is possible to confirm whether or not each cut piece includes a second catalyst layer 42, by observing the cross section thereof using a scanning electron microscope (SEM), an electron probe microanalyzer (EPMA) or the like. At the time of observing the cross section, element mapping of the cross section may be performed. The element mapping can be performed in the same manner as described above.

After confirming whether or not each cut piece includes a second catalyst layer 42, the length of a second catalyst layer 42 included in the sample is calculated based on the following equation.

Length of second catalyst layer 42 included in sample=5 mm×(number of cut pieces each including second catalyst layer 42)

For example, in the case where each of the first cut piece to the k-th cut piece includes a second catalyst layer 42, but each of the (k+1)-th to the n-th cut pieces does not include a second catalyst layer 42, the length of the second catalyst layer 42 included in the sample is (5×k) mm.

In the case of measuring the length of the second catalyst layer 42 included in the sample more specifically, the length is calculated as follows:

The k-th cut piece (namely, the cut piece closest to the exhaust gas outflow side, among the cut pieces each including a second catalyst layer 42) is cut in the axial direction of the wall-flow type substrate 41, and a second catalyst layer 42 existing in the resulting cross section is observed using a scanning electron microscope (SEM), an electron probe microanalyzer (EPMA) or the like, to measure the length of the second catalyst layer 42 existing in the k-th cut piece.

Thereafter, the length of the second catalyst layer 42 included in the sample is calculated based on the following equation.

Length of second catalyst layer 42 included in sample=(5 mm×(k−1))+(length of second catalyst layer 42 in k-th cut piece)

The length of the second catalyst layer 42 included in the sample is calculated for 8 to 16 samples arbitrarily cut out from the second exhaust gas treatment section 4, and the mean value of the measured lengths is defined as the length $L_{42}$ of the second catalyst layers 42.

The amount of the second catalyst layers 42 provided in the wall-flow type substrate 41 can be adjusted suitably, considering, for example, a balance between the exhaust gas purification performance and the cost. From the viewpoint of, for example, a balance between the exhaust gas purification performance and the cost, the mass of the second catalyst layers 42 per unit volume of the wall-flow type substrate 41 (the mass after drying and calcining) is preferably 15 g/L or more and 30 g/L or less, more preferably 17 g/L or more and 24 g/L or less. The volume of the wall-flow type substrate 41 means the apparent volume of the wall-flow type substrate 41.

One example of the method of calculating the mass of the second catalyst layers 42 per unit volume of the wall-flow type substrate 41 will now be described.

A sample extending in the axial direction of the wall-flow type substrate 41 and having the same length as the length $L_{41}$ of the wall-flow type substrate 41 is cut out from the second exhaust gas treatment section 4, and the sample is cut in a plane perpendicular to the axial direction of the wall-flow type substrate 41, to prepare a cut piece S2 which includes a second catalyst layer 42 but does not include a third catalyst layer 43. The cut piece S2 is, for example, in the form of a cylinder having a diameter of 25.4 mm and a length of 10 mm. The values of the diameter and the length of the cut piece S2 can be changed, as necessary. In the case where the third catalyst layers 43 do not extend to the end on the exhaust gas inflow side of the partition wall 413, the second catalyst layers 42 are present but the third catalyst layers 43 are absent, in the vicinity of the end on the exhaust gas inflow side of the partition wall 413. Therefore, the cut piece S2 can be obtained from the vicinity of the end on the exhaust gas inflow side of the partition wall 413. The length of the second catalyst layer 42 included in the cut piece S2 is identical to the length of the cut piece S2.

A cut piece of the wall-flow type substrate 41 having the same size as that of the cut piece S2 is prepared. The cut piece of the wall-flow type substrate 41 does not include either a second catalyst layer 42 or a third catalyst layer 43.

The mass of the cut piece S2 and the mass of the cut piece of the wall-flow type substrate 41 are measured, and the mass of the second catalyst layer 42 per unit volume of the cut piece S2 is calculated based on the following equation.

Mass of second catalyst layer 42 per unit volume of cut piece S2=((mass of cut piece S2)−(mass of cut piece of wall-flow type substrate 41))/(volume of cut piece S2)

The mass of the second catalyst layer 42 per unit volume of the cut piece S2 is calculated for three cut pieces S2 prepared from arbitrary locations of the second exhaust gas treatment section 4, and the mean value of the calculated values is obtained. The mass of the second catalyst layers 42 per unit volume of the wall-flow type substrate 41 is calculated as per the following equation.

Mass of second catalyst layers 42 per unit volume of wall-flow type substrate 41=(mean value of mass of second catalyst layer 42 per unit volume of cut piece S2)×(length $L_{42}$ of second catalyst layers 42/length $L_{41}$ of wall-flow type substrate 41)

The mass of the second catalyst layer 42 per unit volume of the cut piece S2 may be calculated without using the cut piece of the wall-flow type substrate 41. Descriptions on such a calculation method are the same as the above descriptions on the method of calculating the mass of the first catalyst layer 32 per unit volume of the cut piece S1 without using the cut piece of the flow-through type substrate 31.

The second catalyst layers 42 each contain rhodium (Rh) element as a catalytically-active component. The rhodium element contained in the second catalyst layers 42 is in a form capable of functioning as a catalytically-active component, for example, in the form of a rhodium metal, an alloy containing rhodium element, a compound containing rhodium element (for example, an oxide of rhodium element), or the like. The catalytically-active component is preferably in a form of particles, from the viewpoint of enhancing the exhaust gas purification performance.

The amount of the rhodium element contained in the second catalyst layers 42 can be adjusted suitably, considering, for example, a balance between the exhaust gas purification performance and the cost. From the viewpoint of, for example, a balance between the exhaust gas purification performance and the cost, the mass of the rhodium element contained in the second catalyst layers 42 is preferably 1.3% by mass or more and 2.7% by mass or less, more preferably 1.7% by mass or more and 2.4% by mass or less, on the basis of the mass of the second catalyst layers 42. Descriptions on the method of calculating a percentage of the mass of the rhodium element contained in the second catalyst layers 42 to the mass of the second catalyst layers 42 are the same as the above descriptions on the method of calculating the percentage $P_1$. The mass of the rhodium element means a mass in terms of metal.

The second catalyst layers 42 may each contain one or more catalytically-active components other than rhodium element. The catalytically-active component(s) other than rhodium element can be selected, for example, from noble metal elements such as platinum (Pt) element, palladium (Pd) element, ruthenium (Ru) element, iridium (Ir) element, and osmium (Os) element, and is preferably selected from platinum (Pt) element and palladium (Pd) element from the viewpoint of enhancing the exhaust gas purification performance. Such a noble metal element contained in the second catalyst layers 42 is in a form capable of functioning as a catalytically-active component, for example, in the form of a noble metal, an alloy containing a noble metal element, a compound containing a noble metal element (for example, an oxide of a noble metal element), or the like. The catalytically-active component(s) is/are preferably in a form of particles, from the viewpoint of enhancing the exhaust gas purification performance.

In one embodiment, the second catalyst layers 42 each contain rhodium element but do not contain any catalytically-active component other than rhodium element. In another embodiment, the second catalyst layers 42 each contain rhodium element and palladium element but do not contain any catalytically-active component other than rhodium element and palladium element.

In the case where the second catalyst layers 42 each contain a catalytically-active component(s) other than rhodium element, the amount of the catalytically-active component(s) other than rhodium element, contained in the second catalyst layers 42, can be adjusted suitably, considering, for example, a balance between the exhaust gas purification performance and the cost. From the viewpoint of, for example, a balance between the exhaust gas purification performance and the cost, the mass of the catalytically-active component(s) other than rhodium element, contained in the second catalyst layers 42, is preferably 1.3% by mass or more and 2.7% by mass or less, more preferably 1.7% by mass or more and 2.4% by mass or less, on the basis of the mass of the second catalyst layers 42. Descriptions on the method of calculating a percentage of the mass of the catalytically-active component(s) other than rhodium element, contained in the second catalyst layers 42, to the mass of the second catalyst layers 42, are the same as the above descriptions on the method of calculating the percentage $P_1$.

The second catalyst layers 42 preferably each contain a cerium-element-containing inorganic oxide. Descriptions on the cerium-element-containing inorganic oxide are the same as described above. The cerium-element-containing inorganic oxide is preferably a $CeO_2$—$ZrO_2$-based complex oxide. Descriptions on the $CeO_2$—$ZrO_2$-based complex oxide are the same as described above.

The amount of the cerium-element-containing inorganic oxide contained in the second catalyst layers 42 can be adjusted suitably, considering the amount of the cerium-element-containing inorganic oxide contained in the third catalyst layers 43.

A percentage $P_{23}$ of the total of the mass of the cerium element contained in the second catalyst layers 42 in terms of cerium oxide, and the mass of the cerium element contained in the third catalyst layers 43 in terms of cerium oxide, to the total of the mass of the second catalyst layers 42 and the mass of the third catalyst layers 43, is preferably larger than the percentage $P_1$. The oxygen concentration of the exhaust gas flowing into the second exhaust gas treatment section 4 through the first exhaust gas treatment section 3 can vary, and thus, there is a possibility that the catalytic activity of the rhodium element contained in the second catalyst layers 42 (in the case where the third catalyst layers 43 each contain rhodium element, the rhodium element contained in the second catalyst layers 42 and the rhodium element contained in the third catalyst layers 43) is not achieved suitably through the influence of the oxygen concentration of the exhaust gas flowing into the second exhaust gas treatment section 4. In this respect, it is conceivable that, when a percentage $P_{23}$ is larger than the percentage $P_1$, it is possible to inhibit the influence of the oxygen concentration of the exhaust gas flowing into the second exhaust gas treatment section 4, and to suitably express the catalytic activity of the rhodium element contained in the second catalyst layers 42 (in the case where the third catalyst layers 43 each contain rhodium element, the rhodium element contained in the second catalyst layers 42 and the rhodium element contained in the third catalyst layers 43). In other words, it is conceivable that, by increasing the oxygen storage capacity from the upstream side toward the downstream side in the exhaust gas flow direction X, it is possible to enhance the catalytic activity (for example, NOx purification performance) of the rhodium element contained in the second catalyst layers 42 (in the case where the third catalyst layers 43 each contain rhodium element, the rhodium element contained in the second catalyst layers 42 and the rhodium element contained in the third catalyst layers 43).

The percentage $P_{23}$ is preferably 1.1 times or more and 5.3 times or less, more preferably 1.3 times or more and 4.2 times or less, still more preferably 1.7 times or more and 2.9 times or less, larger than the percentage $P_1$. It is conceivable that, when the percentage $P_{23}$ is too small, oxygen sufficient to achieve a suitable catalytic activity cannot be supplied, and that, when the percentage $P_{23}$ is too large, oxygen is supplied excessively, adversely decreasing the catalytic activity. In this respect, it is conceivable that the percentage $P_{23}$ within the abovementioned ranges makes it possible to supply oxygen sufficient to achieve a suitable catalytic activity.

A percentage $P_2$ of the mass of the cerium element contained in the second catalyst layers 42 in terms of cerium oxide, to the mass of the second catalyst layers 42, is preferably larger than the percentage $P_1$. The oxygen concentration of the exhaust gas flowing into the second exhaust gas treatment section 4 through the first exhaust gas treatment section 3 can vary, and thus, there is a possibility that the catalytic activity of the rhodium element contained in the second catalyst layers 42 (in the case where the third catalyst layers 43 each contain rhodium element, the rhodium element contained in the second catalyst layers 42 and the rhodium element contained in the third catalyst layers 43) is not achieved suitably through the influence of the oxygen concentration of the exhaust gas flowing into the second exhaust gas treatment section 4. In this respect, it is conceivable that, when the percentage $P_2$ is larger than the percentage $P_1$, it is possible to inhibit the influence of the oxygen concentration of the exhaust gas flowing into the second exhaust gas treatment section 4, and to suitably express the catalytic activity of the rhodium element contained in the second catalyst layers 42 (in the case where the third catalyst layers 43 each contain rhodium element, the rhodium element contained in the second catalyst layers 42 and the rhodium element contained in the third catalyst layers 43). In other words, it is conceivable that, by increasing the oxygen storage capacity from the upstream side toward the downstream side in the exhaust gas flow direction X, it is possible to enhance the catalytic activity (for example, NOx purification performance) of the rhodium element contained in the second catalyst layers 42 (in the case where the third catalyst layers 43 each contain rhodium element, the rhodium element contained in the second catalyst layers 42 and the rhodium element contained in the third catalyst layers 43).

The percentage $P_2$ is preferably 1.1 times or more and 5.3 times or less, more preferably 1.2 times or more and 2.9 times or less, still more preferably 1.2 times or more and 1.4 times or less, larger than the percentage $P_1$. It is conceivable that, when the percentage $P_2$ is too small, oxygen sufficient to achieve a suitable catalytic activity cannot be supplied, and that, when the percentage $P_2$ is too large, oxygen is supplied excessively, adversely decreasing the catalytic activity. In this respect, it is conceivable that the percentage $P_2$ within the abovementioned ranges makes it possible to supply oxygen sufficient to achieve a suitable catalytic activity.

Descriptions on the method of calculating the percentage $P_2$ are the same as the above descriptions on the method of calculating the percentage $P_1$.

The second catalyst layers 42 preferably each contain another inorganic oxide. Descriptions on the other inorganic oxide are the same as described above.

The amount of the other inorganic oxide contained in the second catalyst layers 42 can be adjusted suitably, considering the thermal endurance of the second catalyst layers 42 and the pressure loss in the second exhaust gas treatment section 4. From the viewpoint of enhancing the thermal endurance of the second catalyst layers 42, the amount of the other inorganic oxide contained in the second catalyst layers 42 is preferably larger, but, as the amount increases, the area of the openings on the exhaust gas inflow side of the inflow-side cells 411 decreases, and the pressure loss increases. Accordingly, the mass of the other inorganic oxide contained in the second catalyst layers 42 is preferably 20% by mass or more and 72% by mass or less, more preferably 20% by mass or more and 57% by mass or less, still more preferably 20% by mass or more and 40% by mass or less, on the basis of the mass of the second catalyst layers 42.

Descriptions on the method of calculating a percentage of the mass of the other inorganic oxide contained in the second catalyst layers 42 to the mass of the second catalyst layers 42 are the same as the above descriptions on the method of calculating the percentage $P_1$.

From the viewpoint of efficiently achieving the exhaust gas purification performance of the catalytically-active component(s), the catalytically-active component(s) is/are preferably supported on the cerium-element-containing inorganic oxide and/or on the other inorganic oxide. The expression that "the catalytically-active component(s) is/are supported on an inorganic oxide" has the same meaning as described above.

The second catalyst layers 42 may each have a single-layer structure, or may each have a laminated structure. In the case where the second catalyst layers 42 each have a laminated structure, the composition of one layer may be the same as or different from that of another layer. For example, a catalytically-active component(s) contained in one layer may be the same as or different from a catalytically-active component(s) contained in another layer.

<Third Catalyst Layers>

The third catalyst layers 43 will now be described.

As shown in FIGS. 5 and 7, the third catalyst layers 43 each include a portion 431 that is formed on the surface on the outflow-side cell 412 side of the partition wall 413. Specifically, the third catalyst layers 43 each include a portion 431 that is formed on the surface on the outflow-side cell 412 side of the partition wall 413, and extends from the end on the exhaust gas outflow side of the partition wall 413 along the direction opposite to the exhaust gas flow direction X. The phase "the surface on the outflow-side cell 412 side of the partition wall 413" refers to the outer surface on the outflow-side cell 412 side of the partition wall 413, which defines the external shape of the partition wall 413. The phase "a portion that is formed on the surface on the outflow-side cell 412 side of the partition wall 413" refers to a portion rising from the outer surface on the outflow-side cell 412 side of the partition wall 413 toward the outflow-side cell 412 side.

In the case where the third catalyst layers 43 each include the portion 431 that is formed on the surface on the outflow-side cell 412 side of the partition wall 413, the exhaust gas supplied to the second exhaust gas treatment section 4 through the first exhaust gas treatment section 3 easily comes in contact with the rhodium element contained in the second catalyst layers 42. This allows the rhodium element contained in the second catalyst layers 42 to efficiently exhibit the catalytic activity. In the case where the third catalyst layers 43 each contain rhodium element, the exhaust gas supplied to the second exhaust gas treatment section 4 through the first exhaust gas treatment section 3 tends to come in contact with the rhodium contained in the third catalyst layers 43, thus allowing the rhodium element contained in the third catalyst layers 43 to efficiently exhibit the catalytic activity. In the case where the third catalyst layers 43 each include the portion 431, the flow rate of the exhaust gas in contact with the second catalyst layers 42 and the third catalyst layers 43 is decreased, as compared with the case where the third catalyst layers 43 do not include the portion 431. This seems to result in increased opportunity for the contact between the exhaust gas and the rhodium element contained in the second catalyst layers 42 (in the case where the third catalyst layers 43 each contain rhodium element, the rhodium element contained in the second catalyst layers 42 and the rhodium element contained in the third catalyst layers 43). In the case where the third catalyst layers 43 each include the portion 431, the apparent density of the third catalyst layers 43 is increased, as compared with the case where the third catalyst layers 43 do not include the portion 431, since the portion 431 of each of the third catalyst layers 43 is not present inside the porous partition wall 413 (in contrast, the portion 432 of each of the third catalyst layers 43 is present inside the porous partition wall 413 as described below). This seems to result in a decrease in the flow rate of the exhaust gas in contact with the second catalyst layers 42 and the third catalyst layers 43.

As shown in FIG. 7, the third catalyst layers 43 may each include a portion 432 that is present inside the partition wall 413, in addition to the portion 431. Since the partition wall 413 is porous, the portion 432 is usually formed in addition to the portion 431, during the formation of the third catalyst layers 43. The region in which the portion 431 is present does not overlap with the region in which the partition wall 413 is present, while the region in which the portion 432 is present overlaps with the region in which the partition wall 413 is present. Therefore, the portion 431 and the portion 432 can be identified by cutting each of the third catalyst layers 43 and analyzing the resulting cross section by cross-sectional observation or the like using a scanning electron microscope (SEM), an electron probe microanalyzer (EPMA) or the like, and identifying the portion 431 and the portion 432 in terms of composition, form, and the like.

The third catalyst layers 43 are formed on the outflow-side cell 412 side in the wall-flow type substrate 41. Whether the third catalyst layers 43 are formed on the outflow-side cell 412 side in the wall-flow type substrate 41 can be judged by whether the portions 431 of the third catalyst layers 43 have a predetermined thickness.

The portions 431 preferably have a suitable thickness from the viewpoint of improving the efficiency of contact between the exhaust gas supplied to the second exhaust gas treatment section 4 through the first exhaust gas treatment section 3 and the rhodium element contained in the second catalyst layers 42 (in the case where the third catalyst layers 43 each contain rhodium element, the rhodium element contained in the second catalyst layers 42 and the rhodium element contained in the third catalyst layers 43). The thickness $T_{431}$ of the portions 431 of the third catalyst layers 43 is preferably 20 μm or more and 100 μm or less, more preferably 40 μm or more and 80 μm or less, still more preferably 45 μm or more and 65 μm or less.

Descriptions on the method of calculating the thickness $T_{431}$ of the portions 431 of the third catalyst layers 43 are the same as the above descriptions on the method of calculating the thickness $T_{421}$ of the portions 421 of the second catalyst layers 42. In the method of calculating the thickness $T_{431}$ of the portions 431 of the third catalyst layers 43, the second exhaust gas treatment section 4 is cut in a plane perpendicular to the axial direction of the wall-flow type substrate 41 (for example, at a position 10 mm away from the end on the exhaust gas outflow side of the wall-flow type substrate 41, in the direction opposite to the exhaust gas flow direction X), and a third catalyst layer 43 present in an outflow-side cell 412 arbitrarily selected from the resulting cross section is observed using a scanning electron microscope (SEM).

A percentage of the length $L_{43}$ of the third catalyst layers 43 to the length $L_{41}$ of the wall-flow type substrate 41 ($L_{43}/L_{41} \times 100$) is preferably 30% or more and 90% or less, more preferably 50% or more and 80% or less, still more preferably 65% or more and 75% or less.

Descriptions on the method of calculating the length $L_{43}$ of the third catalyst layers 43 are the same as the above descriptions on the method of calculating the length $L_{42}$ of the second catalyst layers 42. In the method of calculating the length $L_{43}$ of the third catalyst layers 43, the sample is cut at 5-mm intervals in planes perpendicular to the axial direction of the wall-flow type substrate 41 to obtain the first cut piece, the second cut piece and so on up to the n-th cut piece, sequentially from the side of the end on the exhaust gas outflow side of the sample.

The amount of the third catalyst layers 43 provided in the wall-flow type substrate 41 can be adjusted suitably, considering, for example, a balance between the exhaust gas purification performance and the cost. From the viewpoint of, for example, a balance between the exhaust gas purification performance and the cost, the mass of the third catalyst layers 43 per unit volume of the wall-flow type substrate 41 (the mass after drying and calcining) is preferably 27 g/L or more and 53 g/L or less, more preferably 27 g/L or more and 37 g/L or less. The volume of the wall-flow type substrate 41 means the apparent volume of the wall-flow type substrate 41.

Descriptions on the method of calculating the mass of the third catalyst layers 43 per unit volume of the wall-flow type substrate 41 are the same as the above descriptions on the method of calculating the mass of the second catalyst layers 42.

For example, a sample extending in the axial direction of the wall-flow type substrate 41 and having the same length as the length $L_{41}$ of the wall-flow type substrate 41 is cut out from the second exhaust gas treatment section 4, and the sample is cut in a plane perpendicular to the axial direction of the wall-flow type substrate 41, to prepare a cut piece S3 which includes a third catalyst layer 43 but does not include a second catalyst layer 42. Then, a cut piece of the wall-flow type substrate 41 having the same size as that of the cut piece S3 is prepared. The cut piece of the wall-flow type substrate 41 does not include either a second catalyst layer 42 or a third catalyst layer 43.

The mass of the cut piece S3 and the mass of the cut piece of the wall-flow type substrate 41 are measured, and the mass of the third catalyst layer 43 per unit volume of the cut piece S3 is calculated based on the following equation.

Mass of third catalyst layer 43 per unit volume of cut piece S3=((mass of cut piece S3)−(mass of cut piece of wall-flow type substrate 41))/(volume of cut piece S3)

The mass of the third catalyst layer 43 per unit volume of the cut piece S3 is calculated for three cut pieces S3 prepared from arbitrary locations of the second exhaust gas treatment section 4, and the mean value of the calculated values is obtained. The mass of the third catalyst layers 43 per unit volume of the wall-flow type substrate 41 is calculated based on the following equation.

Mass of third catalyst layers 43 per unit volume of wall-flow type substrate 41=(mean values of mass of third catalyst layer 43 per unit volume of cut piece S3)×(length $L_{43}$ of third catalyst layers 43/length $L_{41}$ of wall-flow type substrate 41)

The mass of the third catalyst layer 43 per unit volume of the cut piece S3 may be calculated without using the cut piece of the wall-flow type substrate 41. Descriptions on such a calculation method are the same as the above descriptions on the method of calculating the mass of the first catalyst layer 32 per unit volume of the cut piece S1 without using the cut piece of the flow-through type substrate 31.

The third catalyst layers 43 each contain one or more catalytically-active components. The catalytically-active component(s) can be selected, for example, from noble metal elements such as platinum (Pt) element, palladium (Pd) element, rhodium (Rh) element, ruthenium (Ru) element, iridium (Ir) element, and osmium (Os) element, and is preferably selected from platinum (Pt) element, palladium (Pd) element, and rhodium (Rh) element from the viewpoint of enhancing the exhaust gas purification performance. Such a noble metal element contained in the third catalyst layers 43 is in a form capable of functioning as a catalytically-active component, for example, in the form of a noble metal, an alloy containing a noble metal element, a compound containing a noble metal element (for example, an oxide of a noble metal element), or the like. The catalytically-active component(s) is/are preferably in a form of particles, from the viewpoint of enhancing the exhaust gas purification performance.

In one embodiment, the third catalyst layers 43 each contain rhodium element but do not contain any catalytically-active component other than rhodium element. In another embodiment, the third catalyst layers 43 each contain rhodium element and palladium element but do not contain any catalytically-active component other than rhodium element and palladium element.

The third catalyst layers 43 may each contain a catalytically-active component(s) different from the catalytically-active component(s) contained in the second catalyst layers 42. This makes it possible to enhance the exhaust gas purification performance of the second exhaust gas treatment section 4. In one embodiment, the third catalyst layers 43 each contain palladium element. In this embodiment, the third catalyst layers 43 may each contain or may not contain a catalytically-active component(s) other than palladium element.

The amount of the catalytically-active component(s) contained in the third catalyst layers 43 can be adjusted suitably, considering, for example, a balance between the exhaust gas purification performance and the cost. From the viewpoint of, for example, a balance between the exhaust gas purification performance and the cost, the mass of the rhodium element or palladium element contained in the third catalyst layers 43 is preferably 0.8% by mass or more and 1.5% by mass or less, more preferably 1.1% by mass or more and 1.5% by mass or less, on the basis of the mass of the third catalyst layers 43. In the case where the third catalyst layers 43 each contain rhodium element and palladium element, the total amount of rhodium element and palladium element is preferably within these ranges. Descriptions on the method of calculating a percentage of the mass of the rhodium element or palladium element contained in the third catalyst layers 43 to the mass of the third catalyst layers 43 are the same as the above descriptions on the method of calculating the percentage $P_1$. The mass of the rhodium element and the mass of the palladium element are each a mass in terms of metal.

The third catalyst layers 43 preferably each contain a cerium-element-containing inorganic oxide. Descriptions on the cerium-element-containing inorganic oxide are the same as described above. The cerium-element-containing inorganic oxide is preferably a $CeO_2$—$ZrO_2$-based complex oxide. Descriptions on the $CeO_2$—$ZrO_2$-based complex oxide are the same as described above.

The amount of the cerium-element-containing inorganic oxide contained in the third catalyst layers 43 can be adjusted suitably, considering the amount of the cerium-element-containing inorganic oxide contained in the second catalyst layers 42.

As described above, the percentage $P_{23}$ is preferably larger than the percentage of the mass of the cerium element contained in the first catalyst layers 32 in terms of cerium oxide, to the mass of the first catalyst layers 32.

As described above, the percentage $P_{23}$ is preferably 1.1 times or more and 5.3 times or less, more preferably 1.3 times or more and 4.2 times or less, still more preferably 1.7 times or more and 2.9 times or less, larger than the percentage $P_1$.

A percentage $P_3$ of the mass of the cerium element contained in the third catalyst layers 43 in terms of cerium oxide, to the mass of the third catalyst layers 43, is preferably larger than the percentage $P_1$. Descriptions on the reason why the percentage $P_3$ is preferably larger than the percentage $P_1$ are the same as the above descriptions on the reason why the percentage $P_2$ is preferably larger than the percentage $P_1$.

The percentage $P_3$ is preferably 1.1 times or more and 5.3 times or less, more preferably 2.4 times or more and 4.4 times or less, still more preferably 2.4 times or more and 3.0 times or less, larger than the percentage $P_1$. It is conceivable that, when the percentage $P_3$ is too small, oxygen sufficient to achieve a suitable catalytic activity cannot be supplied, and that, when the percentage $P_3$ is too large, oxygen is supplied excessively, adversely decreasing the catalytic activity. In this respect, it is conceivable that the percentage $P_3$ within the abovementioned ranges makes it possible to supply oxygen sufficient to achieve a suitable catalytic activity.

Descriptions on the method of calculating the percentage $P_3$ are the same as the above descriptions on the method of calculating the percentage $P_1$.

The third catalyst layers 43 preferably each contain another inorganic oxide. Descriptions on the other inorganic oxide are the same as described above.

The amount of the other inorganic oxide contained in the third catalyst layers 43 can be adjusted suitably, considering the thermal endurance of the third catalyst layers 43 and the pressure loss in the second exhaust gas treatment section 4. From the viewpoint of enhancing the thermal endurance of the third catalyst layers 43, the amount of the other inorganic oxide contained in the third catalyst layers 43 is preferably larger, but, as the amount increases, the area of the openings on the exhaust gas inflow side of the inflow-side cells 411 decreases, and the pressure loss increases. Accordingly, the mass of the other inorganic oxide contained in the third catalyst layers 43 is preferably 19% by mass or more and 63% by mass or less, more preferably 19% by mass or more and 43% by mass or less, on the basis of the mass of the third catalyst layers 43.

Descriptions on the method of calculating the percentage of the mass of the other inorganic oxide contained in the third catalyst layers 43 to the mass of the third catalyst layers 43 are the same as the above descriptions on the method of calculating the percentage $P_1$.

From the viewpoint of efficiently achieving the exhaust gas purification performance of the catalytically-active component(s), the catalytically-active component(s) is/are preferably supported on the cerium-element-containing inorganic oxide and/or on the other inorganic oxide. The expression that "the catalytically-active component(s) is/are supported on an inorganic oxide" has the same meaning as described above.

The third catalyst layer 43 may each have a single-layer structure, or may each have a laminated structure. In the case where the third catalyst layers 43 each have a laminated structure, the composition of one layer may be the same as or different from that of another layer. For example, a catalytically-active component(s) contained in one layer may be the same as or different from a catalytically-active component(s) contained in another layer.

One example of the method of forming the second catalyst layers 42 and the third catalyst layers 43 will now be described.

The wall-flow type substrate 41, a slurry for forming the second catalyst layers 42, and a slurry for forming the third catalyst layers 43 are prepared. In the case where each of the second catalyst layers 42 has a laminated structure, two or more kinds of slurries are prepared as the slurry for forming the second catalyst layers 42. In the case where each of the third catalyst layers 43 has a laminated structure, two or more kinds of slurries are prepared as the slurry for forming the third catalyst layers 43.

The composition of the slurry for forming the second catalyst layers 42 is adjusted depending on the composition of the second catalyst layers 42. The composition of the slurry for forming the third catalyst layers 43 is adjusted depending on the composition of the third catalyst layers 43. The slurry contains, for example, a supply source of a noble metal element, inorganic oxide particles, a binder, a pore forming agent, a solvent, or the like. Descriptions on a supply source of a noble metal element, inorganic oxide particles, a binder, a pore forming agent, a solvent, and the like that can be used are the same as the above descriptions on the slurry for forming the first catalyst layers 32.

The slurry for forming the second catalyst layer 42 is applied to the wall-flow type substrate 41, dried, and calcined if desired. These operations are repeated in the case where the second catalyst layers 42 each have a laminated structure. In this manner, precursor layers of the second catalyst layers 42 are formed. It is possible to adjust the length of the precursor layers of the second catalyst layers 42 (eventually, the length of the second catalyst layers 42) by adjusting the solid concentration, viscosity, and the like of the slurry. In addition, by adjusting the coating amount of the slurry, the types of the materials for forming the slurry, the particle size of the pore forming agent contained in the slurry, and the like, it is possible to adjust the thickness of the precursor layers of the second catalyst layers 42 (eventually, the thickness of the second catalyst layers 42), and the mass of the precursor layers of the second catalyst layers 42 (eventually, the mass of the second catalyst layer 42).

The slurry for forming the third catalyst layers 43 is applied to the wall-flow type substrate 41, dried, and calcined if desired. These operations are repeated in the case where the third catalyst layers 43 each have a laminated structure. In this manner, precursor layers of the third catalyst layers 43 are thus formed. It possible to adjust the length of the precursor layers of the third catalyst layers 43 (eventually, the length of the third catalyst layers 43) by adjusting the solid concentration, viscosity, and the like of the slurry. In addition, by adjusting the coating amount of the slurry, the types of the materials for forming the slurry, the particle size of the pore forming agent contained in the slurry, and the like, it is possible to adjust the thickness of the precursor layers of the third catalyst layers 43 (eventually, the thickness of the third catalyst layers 43), and the mass of the precursor layers of the third catalyst layers 43 (eventually, the mass of the third catalyst layers 43).

The drying temperature is usually 70° C. or more and 200° C. or less, preferably 90° C. or more and 150° C. or less. The drying time is usually 1 hour or more and 3 hours or less, preferably 1.5 hours or more and 2 hours or less.

The slurry for forming the second catalyst layers 42 can be applied, for example, by dipping the end on the exhaust gas inflow side of the wall-flow type substrate 41 in the slurry for forming the second catalyst layers 42, and sucking the slurry from the opposite side.

The slurry for forming the third catalyst layers 43 can be applied, for example, by dipping the end on the exhaust gas outflow side of the wall-flow type substrate 41 in the slurry for forming the third catalyst layers 43, and sucking the slurry from the opposite side.

After the formation of the precursor layers of the second catalyst layers 42 and the precursor layers of the third catalyst layers 43, the resulting substrate is calcined. In this manner, the second catalyst layers 42 and the third catalyst layers 43 are formed. The calcination temperature is usually 450° C. or more and 700° C. or less, preferably 450° C. or more and 600° C. or less. The calcination time is usually 1 hour or more and 4 hours or less, preferably 1.5 hours or more and 2 hours or less. The calcination can be carried out, for example, in an air atmosphere.

The particle size of the pore forming agent can be adjusted as appropriate. However, the median $D_{50}$ of the pore forming agent is usually 5 μm or more and 50 μm or less, preferably 10 μm or more and 30 μm or less, from the viewpoint of reducing delamination, reducing pressure drop, and improving the PM collecting performance, and the like. The larger the particle size of the pore forming agent is, the larger the thickness of the second catalyst layers 42 and the thickness of the third catalyst layers 43 become. The $D_{50}$ is measured in the same manner as described above.

Examples

Embodiments of the present invention will be specifically described with reference to Examples, but the present invention is not limited to the Examples.

Production of First Exhaust Gas Treatment Section A
(1) Preparation of Slurry for Forming Lower Layers An OSC material (cerium-element-containing inorganic oxide) having the following composition and BET specific surface area was made ready for use.

$CeO_2$: 30% by mass, $ZrO_2$: 55% by mass, $Y_2O_3$: 5% by mass, $La_2O_3$: 5% by mass, $Nd_2O_3$: 5% by mass, BET specific surface area: 80 m$^2$/g The formation of a solid solution phase by $CeO_2$, $Y_2O_3$, $La_2O_3$, $Nd_2O_3$, and $ZrO_2$ in the OSC material was confirmed.

To a ball mill pot, the OSC material, lanthanum oxide-modified alumina (the modification amount of $La_2O_3$: 1% by mass, the BET specific surface area: 100 m$^2$/g), barium acetate, alumina sol, and water were added and mixed, and the resulting mixture was pulverized using a ball mill to yield a base slurry. This base slurry and an aqueous palladium nitrate solution were mixed to yield a slurry for forming lower layers. The quantitative ratios of the components in the slurry for forming lower layers were adjusted so that lower layers each containing 28.2% by mass of the OSC material, 47.0% by mass of lanthanum oxide-modified alumina, 10.0% by mass of barium carbonate, 10.0% by mass of alumina, and 4.8% by mass of palladium could be obtained after calcination.

(2) Formation of Lower Layers

A flow-through type substrate was dipped in the resulting slurry for forming lower layers. The flow-through type substrate was dried at 150° C. for 2.5 hours, and then calcined at 450° C. for 2.5 hours to form lower layers. The mass of the lower layers per unit volume of the flow-through type substrate was 130 g/L. The amount of palladium contained in the lower layers per unit volume of the flow-through type substrate was 6.2 g/L in terms of metal. The flow-through type substrate used had a structure shown in FIG. 2, included cells each extending in the axial direction and separated by a partition wall having a thickness of 50 to 70 μm, at an density of 600 cells/inch$^2$ in a plane perpendicular to the axial direction, and had a volume of 1.0 L.

(3) Preparation of Slurry for Forming Upper Layers

A $ZrO_2$ material having the following composition and BET specific surface area was made ready for use.

$ZrO_2$: 85% by mass, $Y_2O_3$: 5% by mass, $La_2O_3$: 5% by mass, $Nd_2O_3$: 5% by mass, BET specific surface area: 80 m$^2$/g.

The formation of a solid solution by $ZrO_2$, $Y_2O_3$, $La_2O_3$, and $Nd_2O_3$ in the $ZrO_2$ material was confirmed.

To a ball mill pot, the $ZrO_2$ material, lanthanum-modified alumina (the modification amount of $La_2O_3$: 1% by mass, the BET specific surface area: 100 m$^2$/g), alumina sol, and water were added and mixed, and the resulting mixture was pulverized using a ball mill to yield a base slurry. This base slurry and an aqueous rhodium nitrate solution were mixed to yield a slurry for forming upper layers. The quantitative ratios of the components in the slurry for forming upper layers were adjusted so that upper layers each containing 66.7% by mass of the $ZrO_2$ material, 22.0% by mass of lanthanum-modified alumina, 10.0% by mass of alumina, and 1.3% by mass of rhodium in terms of metal could be obtained after calcination.

(4) Formation of Upper Layer

The flow-through type substrate having the lower layers formed therein was dipped in the resulting slurry for forming upper layers. The flow-through type substrate was dried at 150° C. for 2.5 hours, and then calcined at 450° C. for 2.5 hours. Thus, an exhaust gas purification catalyst including the flow-through type substrate and first catalyst layers formed on the flow-through type substrate was produced. The exhaust gas purification catalyst produced was used as a first exhaust gas treatment section. The first catalyst layers each had a two-layer structure composed of the lower layer and the upper layer formed all over the surface of the lower layer. The mass of the upper layers after calcination per unit volume of the flow-through type substrate was 60 g/L. The amount of rhodium contained in the upper layers per unit volume of the flow-through type substrate was 0.8 g/L in terms of metal.

Production of first exhaust gas treatment section B

A first exhaust gas treatment section B was produced in the same manner as the first exhaust gas treatment section A except that, in the formation of the lower layers of the first exhaust gas treatment section, the quantitative ratios of the components in the slurry for forming lower layers were changed so that lower layers each containing 35.9% by mass of the OSC material, 39.3% by mass of lanthanum oxide-modified alumina, 10.0% by mass of barium carbonate, 10.0% by mass of alumina, and 4.8% by mass of palladium could be obtained after calcination, and that, in the formation of the upper layers of the first exhaust gas treatment section, the $ZrO_2$ material in the slurry forming upper layers was changed to an OSC material having the following composition and BET specific surface area: $CeO_2$: 5% by mass, $ZrO_2$: 80% by mass, $Y_2O_3$: 5% by mass, $La_2O_3$: 5% by mass, $Nd_2O_3$: 5% by mass, and BET specific surface area: 80 $m^2/g$.

Production of First Exhaust Gas Treatment Section C

A first exhaust gas treatment section C was produced in the same manner as the first exhaust gas treatment section A except that, in the formation of the lower layers of the first exhaust gas treatment section, the quantitative ratios of the components in the slurry for forming lower layers were changed so that lower layers each containing 35.9% by mass of the OSC material, 39.3% by mass of lanthanum oxide-modified alumina, 10.0% by mass of barium carbonate, 10.0% by mass of alumina, and 4.8% by mass of palladium could be obtained after calcination, and that, in the formation of the upper layers of the first exhaust gas treatment section, the $ZrO_2$ material in the slurry forming upper layers was changed to an OSC material having the following composition and BET specific surface area: $CeO_2$: 10% by mass, $ZrO_2$: 75% by mass, $Y_2O_3$: 5% by mass, $La_2O_3$: 5% by mass, $Nd_2O_3$: 5% by mass, and BET specific surface area: 80 $m^2/g$.

Production of First Exhaust Gas Treatment Section D

A first exhaust gas treatment section D was produced in the same manner as the first exhaust gas treatment section A except that, in the formation of the lower layers of the first exhaust gas treatment section, the quantitative ratios of the components in the slurry for forming lower layers were changed so that lower layers each containing 46.2% by mass of the OSC material, 29.0% by mass of lanthanum oxide-modified alumina, 10.0% by mass of barium carbonate, 10.0% by mass of alumina, and 4.8% by mass of palladium could be obtained after calcination, and that, in the formation of the upper layers of the first exhaust gas treatment section, the $ZrO_2$ material in the slurry forming upper layers was changed to an OSC material having the following composition and BET specific surface area: $CeO_2$: 10% by mass, $ZrO_2$: 75% by mass, $Y_2O_3$: 5% by mass, $La_2O_3$: 5% by mass, $Nd_2O_3$: 5% by mass, and BET specific surface area: 80 $m^2/g$.

Production of First Exhaust Gas Treatment Section E

A first exhaust gas treatment section E was produced in the same manner as the first exhaust gas treatment section A except that, in the formation of the lower layers of the first exhaust gas treatment section, the quantitative ratios of the components in the slurry for forming lower layers were changed so that lower layers each containing 23.1% by mass of the OSC material, 52.1% by mass of lanthanum oxide-modified alumina, 10.0% by mass of barium carbonate, 10.0% by mass of alumina, and 4.8% by mass of palladium could be obtained after calcination.

Production of First Exhaust Gas Treatment Section F

A first exhaust gas treatment section F was produced in the same manner as the first exhaust gas treatment section A except that, in the formation of the lower layers of the first exhaust gas treatment section, the quantitative ratios of the components in the slurry for forming lower layers were changed so that lower layers each containing 51.3% by mass of the OSC material, 23.9% by mass of lanthanum oxide-modified alumina, 10.0% by mass of barium carbonate, 10.0% by mass of alumina, and 4.8% by mass of palladium, and that, in the formation of the upper layers of the first exhaust gas treatment section, the $ZrO_2$ material in the slurry forming upper layers was changed to an OSC material having the following composition and BET specific surface area: $CeO_2$: 15% by mass, $ZrO_2$: 70% by mass, $Y_2O_3$: 5% by mass, $La_2O_3$: 5% by mass, $Nd_2O_3$: 5% by mass, and BET specific surface area: 80 $m^2/g$.

Production of second exhaust gas treatment section a (1) Preparation of Slurry for Forming Second Catalyst Layers $CeO_2$—$ZrO_2$ solid solution powder (in which the $CeO_2$—$ZrO_2$ solid solution contained 15% by mass of $CeO_2$, 70% by mass of $ZrO_2$, and 15% by mass of oxide of a rare earth element other than Ce) and alumina powder were made ready for use. The $CeO_2$—$ZrO_2$ solid solution powder and the alumina powder were mixed, and an aqueous rhodium nitrate solution was impregnated with the resulting mixture.

Then, with this liquid mixture, a pore forming agent (cross-linked methyl poly(meth)acrylate particles), alumina sol, zirconia sol, and water as a liquid medium were mixed to prepare a slurry for forming second catalyst layers. The mass ratios of the components in the slurry were adjusted so that, in second catalyst layers after calcination, the ratio of rhodium could be 2.3% by mass, and the ratios of the components other than rhodium could be as follows: $CeO_2$—$ZrO_2$ solid solution powder: 81.4% by mass, alumina: 10.6% by mass, alumina sol: 5.0% by mass, and zirconia: 3.0% by mass, and that the ratio of the pore forming agent could be 30.0% by mass on the basis of the mass of the catalyst layers after calcination.

(2) Preparation of Slurry for Forming Third Catalyst Layer $CeO_2$—$ZrO_2$ solid solution powder (in which the $CeO_2$—$ZrO_2$ solid solution contained 15% by mass of $CeO_2$, 70% by mass of $ZrO_2$, and 10% by mass of oxide of a rare earth element other than Ce) and alumina powder were mixed, and an aqueous rhodium nitrate solution was impregnated with the resulting mixture.

Then, with this liquid mixture, a pore forming agent (cross-linked methyl poly(meth)acrylate particles), alumina sol, zirconia sol, and water as a liquid medium were mixed to prepare a slurry for forming third catalyst layers. The mass ratios of the components in the slurry were adjusted so that, in third catalyst layers after calcination, the ratio of rhodium could be 1.5% by mass, and the ratios of the components other than rhodium could be as follows: $CeO_2$—$ZrO_2$ solid solution powder: 81.5% by mass, alumina: 10.5% by mass, alumina sol: 5.0% by mass, and zirconia: 3.0% by mass, and that the ratio of the pore forming agent could be 30% by mass on the basis of the mass of the catalyst layers after calcination.

(3) Formation of Precursor Layers of Second Catalyst Layers

The wall-flow type substrate used had a structure shown in FIG. 5, included cells each extending in the axial direction and separated by a partition wall having a thickness of 200 to 250 μm, at an density of 300 cells/inch$^2$ in a plane perpendicular to the axial direction, and had a volume of 1.4 L. In the wall-flow type substrate, the area of the opening of one inflow-side cell in the end plane on the inflow side was generally the same as the area of the opening of one outflow-side cell in the end plane on the outflow side.

The end on the upstream side in the exhaust gas flow direction of the wall-flow type substrate was dipped in the slurry for forming second catalyst layers, and the slurry was sucked from the downstream side, and dried at 70° C. for 10 minutes. Thus, layers composed of the solid components of the slurry for forming second catalyst layers (precursor layers of second catalyst layers) were each formed on a surface on the inflow-side cell side of the partition wall of the wall-flow type substrate.

(4) Formation of Precursor Layers of Third Catalyst Layers

After the precursor layers of second catalyst layers were formed, the end on the downstream side in the exhaust gas flow direction of the wall-flow type substrate was dipped in the slurry for forming third catalyst layers, and the slurry was sucked from the upstream side, and dried at 70° C. for 10 minutes. Thus, layers composed of the solid components of the slurry for forming third catalyst layers (precursor layers of third catalyst layers) were each formed on a surface on the outflow-side cell side of the partition wall of the wall-flow type substrate.

(5) Calcination

After the precursor layers of second catalyst layers and the precursor layers of third catalyst layers were formed, the wall-flow type substrate was calcinated at 450° C. for 1 hour. Thus, an exhaust gas purification catalyst including the wall-flow type substrate, second catalyst layers, and third catalyst layers, wherein the second catalyst layers and the third catalyst layers were formed on the wall-flow type substrate, was produced, and the exhaust gas purification catalyst produced was used as a second exhaust gas treatment section. The second catalyst layers and the third catalyst layers were each composed of a single layer.

The ratio of the length of the second catalyst layers to the full length of the wall-flow type substrate was 45%. The mass of the second catalyst layers after calcination per unit volume of the wall-flow type substrate, which was calculated on the basis of the volume of the whole wall-flow type substrate, was 17.6 g/L as the mass after calcination. The ratio of the length of the third catalyst layers to the full length of the wall-flow type substrate was 70%. The mass of the third catalyst layers after calcination per unit volume of the wall-flow type substrate, which was calculated on the basis of the volume of the whole wall-flow type substrate, was 27.4 g/L as the mass after calcination.

The resulting exhaust gas purification catalyst was cut in a plane perpendicular to the axial direction of the wall-flow type substrate. The second and third catalyst layers present in the cross section were observed using a scanning electron microscope (SEM) to identify the forms of the second and third catalyst layers. In the observation of the second catalyst layer, the exhaust gas purification catalyst was cut at a position 10 mm away from the end on the exhaust gas inflow side of the substrate in the axial direction of the substrate. In the observation of the third catalyst layer, the exhaust gas purification catalyst was cut at a position 10 mm away from the end on the exhaust gas outflow side of the substrate in the axial direction of the substrate.

In the cross-sectional observation by SEM, the field magnification was set to 300 times, the total field width (the length in the direction perpendicular to the axial direction of the substrate) was set to 500 to 600 μm. Each region to be observed by SEM was selected so as not to include any of the corners of each cell.

Figure 8:
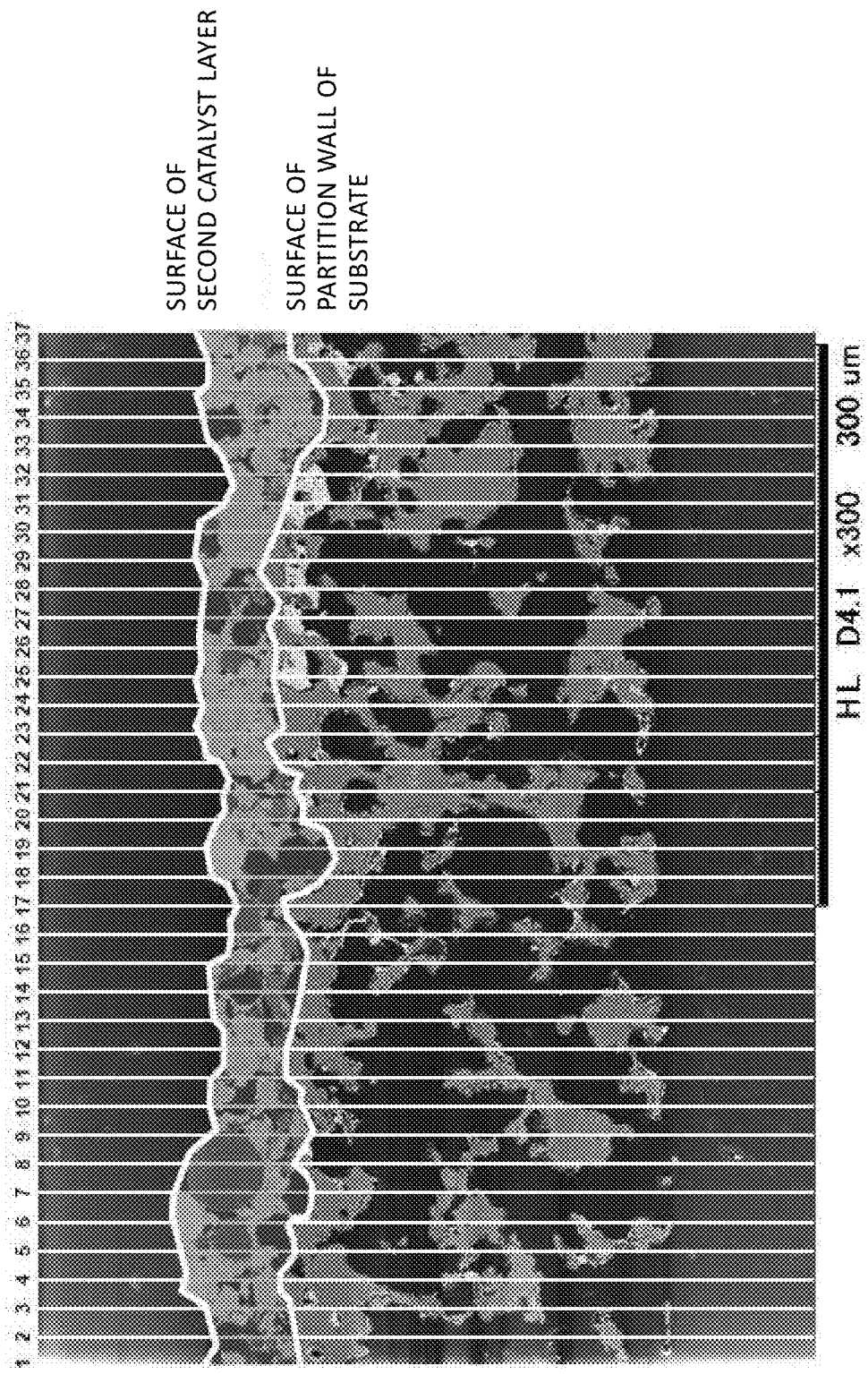
FIG. 8 is an SEM observation image, obtained by cutting an exhaust gas purification catalyst in a plane perpendicular to the axial direction of the substrate, and observing the cross section using a scanning electron microscope (SEM).

FIG. 8 shows an SEM observation image of a portion in which only the second catalyst layer was formed. As shown in FIG. 8, it was possible to identify the region in which the partition wall of the wall-flow type substrate is present and the region in which the second catalyst layer is present, based on the difference in form between the second catalyst layer and the partition wall of the wall-flow type substrate. Likewise, it was also possible to identify the region in which the partition wall of the wall-flow type substrate is present and the region in which the third catalyst layer is present, based on the difference in form between the third catalyst layer and the partition wall of the wall-flow type substrate.

The second catalyst layer had a portion formed on the surface on the inflow-side cell side of the partition wall, and extending from the end on the upstream side of the wall-flow type substrate toward the downstream side thereof along the exhaust gas flow direction (a portion rising from the surface on the inflow-side cell side of the partition wall toward the inflow-side cell side). The surface on the inflow-side cell side of the partition wall is the outer surface thereof on the inflow-side cell side, which defines the external shape of the partition wall. The portion formed on the surface on the inflow-side cell side of the partition wall is a portion rising from the outer surface on the inflow-side cell side of the partition wall toward the inflow-side cell side, and is hereinafter sometimes referred to as "the rising portion of the second catalyst layer".

The third catalyst layer had a portion formed on the surface on the outflow-side cell side of the partition wall, and extending from the end on the downstream side of the wall-flow type substrate toward the upstream side thereof along the exhaust gas flow direction (a portion rising from the surface on the outflow-side cell side of the partition wall toward the outflow-side cell side). The surface on the outflow-side cell side of the partition wall is the outer surface thereof on the outflow-side cell side, which defines the external shape of the partition wall. The portion formed on the surface on the outflow-side cell side of the partition wall is a portion rising from the outer surface on the outflow-side cell side of the partition wall toward the outflow-side cell side, and is hereinafter sometimes referred to as "the rising portion of the third catalyst layer".

As shown in FIG. 8, in the SEM observation image, the first to the 37-th grid lines perpendicular to the axial direction of the substrate were drawn at 15 μm intervals, sequentially from the left end side of the image, and the intersections of the outline of the region in which the partition wall of the substrate is present and the respective grid lines were connected with straight lines, to identify the position of the surface of the partition wall of the substrate. In the same manner, the intersections of the outline of the region in which the first catalyst layer is present and the respective grid lines were connected with straight lines, to identify the position of the surface of the first catalyst layer. In the case where the amount of change in the thickness direction from a certain intersection P1 to an intersection P2 adjacent to the intersection P1 exceeded the interval (15 μm) between two adjacent grid lines, the intersection P2 was not used in the identification of the position of the surfaces (namely, the intersection P2 was excluded from the intersections to be connected with straight lines). Further, in the case where the amount of change in the thickness direction from the intersection P1 to the intersection P2 adjacent to the intersection P1 exceeded the interval (15 μm) between two adjacent grid lines, and the amount of change in the thickness direction from the intersection P1 to an intersection P3 adjacent to the intersection P2 also exceeded the interval (15 μm) between two adjacent grid lines, the intersection P3 in addition to the intersection P2 were not used in the identification of the position of the surfaces (namely, the intersection P2 and the intersection P3 were excluded from the intersections to be connected with straight lines). When five successive intersections were excluded from the intersections to be connected with straight lines in such a manner, this SEM image was not used the measurement of the thickness.

After identifying the position of the surface of the partition wall of the substrate and the position of the surface of the second catalyst layer, the area of the region surrounded by the second grid line, the 36th grid line, the surface of the partition wall of the substrate and the surface of the second catalyst layer, was determined, using image analysis software. AreaQ (manufactured by S-Tech Corporation) was used as the image analysis software. The first grid line and the 37th grid line were not used, because the image is more likely to be unclear at both ends thereof, making it difficult to identify the position of the surface of the partition wall and the position of the surface of the second catalyst layer.

After determining the area of the above-described region, the thickness of the above-described region was calculated based on the following equation:

Thickness of the above-described region=area of the above-described region/(interval between grid lines×number of intervals between grid lines)

The interval between the grid lines is 15 μm, and the number of intervals between the grid lines is 34.

The thickness of the above-described region was calculated for 20 second catalyst layers arbitrarily selected from the cross section, and the mean value of the measured thicknesses was calculated to be 47 μm. The calculated mean value was defined as the thickness of the rising portions of the second catalyst layers. The thickness of the rising portions of the third catalyst layers was calculated in the same manner, to be 41 μm.

Production of Second Exhaust Gas Treatment Section b

A second exhaust gas treatment section b was produced in the same manner as the second exhaust gas treatment section a except that, in the formation of the second catalyst layers of the second exhaust gas treatment section, the $CeO_2$—$ZrO_2$ solid solution powder used to prepare the slurry for forming second catalyst layers was changed to $CeO_2$—$ZrO_2$ solid solution powder in which the $CeO_2$—$ZrO_2$ solid solution contained 32% by mass of $CeO_2$, 58% by mass of $ZrO_2$, and 10% by mass of oxide of a rare earth element other than Ce, the $CeO_2$—$ZrO_2$ solid solution powder and alumina powder were mixed, and the resulting mixture was impregnated with a mixture solution of rhodium nitrate and palladium nitrate adjusted so that, in the second catalyst layers, the amount of Rh could be 0.6% by mass in terms of metal, and the amount of Pd could be 1.7% by mass in terms of metal; and that, in the formation of the third catalyst layers of the second exhaust gas treatment section, the $CeO_2$—$ZrO_2$ solid solution powder used to prepare the slurry for forming third catalyst layers was changed to $CeO_2$—$ZrO_2$ solid solution powder in which the $CeO_2$—$ZrO_2$ solid solution contained 32% by mass of $CeO_2$, 58% by mass of $ZrO_2$, and 10% by mass of oxide of a rare earth element other than Ce, the $CeO_2$—$ZrO_2$ solid solution powder and alumina powder were mixed, and the resulting mixture was impregnated with a mixture solution of rhodium nitrate and palladium nitrate adjusted so that, in the third catalyst layers, the amount of Rh could be 0.4% by mass in terms of metal, and the amount of Pd could be 1.1% by mass in terms of metal.

Production of Second Exhaust Gas Treatment Section c

A second exhaust gas treatment section c was produced in the same manner as the second exhaust gas treatment section a except that, in the formation of the second catalyst layers of the second exhaust gas treatment section, the resulting mixture was impregnated with a mixture solution of rhodium nitrate and palladium nitrate adjusted so that, in the second catalyst layers, the amount of Rh could be 0.6% by mass in terms of metal, and the amount of Pd could be 1.7% by mass in terms of metal; and that, in the formation of the third catalyst layers of the second exhaust gas treatment section, the $CeO_2$—$ZrO_2$ solid solution powder used to prepare the slurry for forming third catalyst layers was changed to $CeO_2$—$ZrO_2$ solid solution powder in which the $CeO_2$—$ZrO_2$ solid solution contained 20% by mass of $CeO_2$, 70% by mass of $ZrO_2$, and 10% by mass of oxide of a rare earth element other than Ce, the $CeO_2$—$ZrO_2$ solid solution powder and alumina powder were mixed, and the resulting mixture was impregnated with a mixture solution of rhodium nitrate and palladium nitrate adjusted so that, in the third catalyst layers, the amount of Rh could be 0.4% by mass in terms of metal, and the amount of Pd could be 1.1% by mass in terms of metal.

Production of Second Exhaust Gas Treatment Section d

A second exhaust gas treatment section d was produced in the same manner as the second exhaust gas treatment section a except that, in the formation of the second catalyst layers of the second exhaust gas treatment section, the resulting mixture was impregnated with a rhodium nitrate solution adjusted so that, in the second catalyst layers, the amount of Rh could be 1.7% by mass in terms of metal, and the mass of the second catalyst layers after calcination per unit volume of the wall-flow type substrate, which was calculated on the basis of the volume of the whole wall-flow type substrate, was 23.5 g/L as the mass after calcination; and that, in the formation of the third catalyst layers of the second exhaust gas treatment section, the $CeO_2$—$ZrO_2$ solid solution powder used to prepare the slurry for forming third catalyst layers was changed to $CeO_2$—$ZrO_2$ solid solution powder in which the $CeO_2$—$ZrO_2$ solid solution contained 20% by mass of $CeO_2$, 70% by mass of $ZrO_2$, and 10% by mass of oxide of a rare earth element other than Ce, the resulting mixture was impregnated with a rhodium nitrate solution adjusted so that, in the third catalyst layers, the amount of Rh could be 1.1% by mass in terms of metal, and the mass of the third catalyst layers after calcination per unit volume of the wall-flow type substrate, which was calculated on the basis of the volume of the whole wall-flow type substrate, was 36.5 g/L as the mass after calcination.

Production of Second Exhaust Gas Treatment Section e

A second exhaust gas treatment section e was produced in the same manner as the second exhaust gas treatment section a except that, in the formation of the second catalyst layers of the second exhaust gas treatment section, the $CeO_2$—$ZrO_2$ solid solution powder used to prepare the slurry for forming second catalyst layers was changed to $CeO_2$—$ZrO_2$ solid solution powder in which the $CeO_2$—$ZrO_2$ solid solution contained 23% by mass of $CeO_2$, 67% by mass of $ZrO_2$, and 10% by mass of oxide of a rare earth element other than Ce, the resulting mixture was impregnated with a rhodium nitrate solution adjusted so that, in the second catalyst layers, the amount of Rh could be 1.7% by mass in terms of metal, and the mass of the second catalyst layers after calcination per unit volume of the wall-flow type substrate, which was calculated on the basis of the volume of the whole wall-flow type substrate, was 23.5 g/L as the mass after calcination; and that, in the formation of the third catalyst layers of the second exhaust gas treatment section, the $CeO_2$—$ZrO_2$ solid solution powder used to prepare the slurry for forming third catalyst layers was changed to $CeO_2$—$ZrO_2$ solid solution powder in which the $CeO_2$—$ZrO_2$ solid solution contained 30% by mass of $CeO_2$, 60% by mass of $ZrO_2$, and 10% by mass of oxide of a rare earth element other than Ce, and the $CeO_2$—$ZrO_2$ solid solution powder and alumina powder were mixed.

Production of Second Exhaust Gas Treatment Section f

A second exhaust gas treatment section f was produced in the same manner as the second exhaust gas treatment section a except that, in the formation of the second catalyst layers of the second exhaust gas treatment section, the $CeO_2$—$ZrO_2$ solid solution powder used to prepare the slurry for forming second catalyst layers was changed to $CeO_2$—$ZrO_2$ solid solution powder in which the $CeO_2$—$ZrO_2$ solid solution contained 8% by mass of $CeO_2$, 82% by mass of $ZrO_2$, and 10% by mass of oxide of a rare earth element other than Ce; and that, in the formation of the third catalyst layers of the second exhaust gas treatment section, the $CeO_2$—$ZrO_2$ solid solution powder used to prepare the slurry for forming third catalyst layers was changed to $CeO_2$—$ZrO_2$ solid solution powder in which the $CeO_2$—$ZrO_2$ solid solution contained 10% by mass of $CeO_2$, 80% by mass of $ZrO_2$, and 10% by mass of oxide of a rare earth element other than Ce.

The compositions of the first catalyst layers of the first exhaust gas treatment sections A to F are listed in Table 1, and the compositions of the second catalyst layers and the third catalyst layers of the second exhaust gas treatment sections a to f are listed in Table 2.

section was disposed downstream in the exhaust gas path. The exhaust gas treatment sections were treated for the following period of time in contact with exhaust gas emitted from an engine operated under the following conditions with the catalyst temperature held at the following temperature.

<Aging Conditions>
 Engine used for aging test: NA 2L gasoline engine for a passenger vehicle
 Gasoline used: commercially available regular gasoline
 Aging temperature and time: 1000° C. in the layers of the first exhaust gas treatment section, for 80 hours
 Change in air-fuel ratio in preceding stage of catalyst: a cycle of A/F=14.6 (20 seconds)->fuel cut off control (5 seconds)->12.5 (5 seconds). This cycle was repeated.

After the aging test was performed under the abovementioned conditions, the first exhaust gas treatment section after the aging test and the second exhaust gas treatment section after the aging test were combined as seen in Table 3, and mounted in the below-mentioned vehicle in such a manner that the first exhaust gas treatment section after the aging test was located upstream in the exhaust gas flow path, and that the second exhaust gas treatment section after the aging test was located downstream in the exhaust gas flow path. In a vehicle test, the vehicle was driven in accordance

TABLE 1

First Exhaust Gas Treatment Section

| Sample No. | Type of Noble Metal (Upper Layers/ Lower Layers) | Total Mass of Upper Layers and Lower Layers [g/L] | $CeO_2$ Amount in Upper Layers [g/L] | $CeO_2$ Amount in Lower Layers [g/L] | Total $CeO_2$ Amount [g/L] | Total $CeO_2$ Amount/ Total Mass of Upper Layers and Lower Layers |
|---|---|---|---|---|---|---|
| A | Rh/Pd | 190 | 0.0 | 11.0 | 11.0 | 5.8% |
| B | Rh/Pd | 190 | 2.0 | 14.0 | 16.0 | 8.4% |
| C | Rh/Pd | 190 | 4.0 | 14.0 | 18.0 | 9.5% |
| D | Rh/Pd | 190 | 4.0 | 18.0 | 22.0 | 11.6% |
| E | Rh/Pd | 190 | 0.0 | 9.0 | 9.0 | 4.7% |
| F | Rh/Pd | 190 | 6.0 | 20.0 | 26.0 | 13.7% |

TABLE 2

Second Exhaust Gas Treatment Section

| | Second Catalyst Layers | | | | Third Catalyst Layers | | | | |
|---|---|---|---|---|---|---|---|---|---|
| Sample No. | Type of Noble Metal (single-layer) | Mass [g/L] | $CeO_2$ Amount [g/L] | $CeO_2$ Amount/ Mass of Second Catalyst Layers | Type of Noble Metal (single-layer) | Mass [g/L] | $CeO_2$ Amount [g/L] | $CeO_2$ Amount/ Mass of Third Catalyst Layers | Total $CeO_2$ Amount/ Total Mass of Second Catalyst Layers and Third Catalyst Layers |
| a | Rh | 17.6 | 2.1 | 11.9% | Rh | 27.4 | 3.3 | 12.0% | 12.0% |
| b | Pd + Rh | 17.6 | 4.5 | 25.6% | Pd + Rh | 27.4 | 7.0 | 25.5% | 25.6% |
| c | Pd + Rh | 17.6 | 2.1 | 11.9% | Pd + Rh | 27.4 | 4.4 | 16.1% | 14.4% |
| d | Rh | 23.5 | 2.8 | 12.0% | Rh | 36.5 | 5.8 | 16.0% | 14.4% |
| e | Rh | 23.5 | 4.3 | 18.3% | Pd + Rh | 27.4 | 6.7 | 24.5% | 21.6% |
| f | Rh | 17.6 | 1.1 | 6.0% | Pd + Rh | 27.4 | 2.2 | 8.0% | 7.2% |

Examples 1 to 8 and Comparative Examples 1 to 3: Evaluation of Exhaust Gas Purification Performance The first exhaust gas treatment section and the second exhaust gas treatment section were subjected to a degradation treatment performed under the following aging conditions, comparable to driving 160,000 to 240,000 kilometers. Specifically, the first exhaust gas treatment section was disposed upstream in an exhaust gas path through which exhaust gas flowed, and the second exhaust gas treatment with the driving conditions of Worldwide Harmonized Light Vehicles Test Cycles (WLTC). A measurement was taken of NMHC (hydrocarbons other than methane) and NOx in the exhaust gas that passed through the first exhaust gas treatment section and the second exhaust gas treatment section over 1800 seconds from the start of driving, and the amount of emission per unit distance driven was determined. The emission values measured are listed in Table 3, in which the values for Example 1 were each regarded as 1, and used as a basis. In addition, the amounts of emission of NMHC and NOx together with the amount of emission (the amount of total emission) based on WLTC are listed in Table 3.

<Purification Rate Measurement Conditions>

Vehicle for evaluation: 1.5-L direct-injection turbo passenger car

Gasoline used: fuel for authentication tests

TABLE 3

| | First Exhaust Gas Treatment Section Sample No. | Second Exhaust Gas Treatment Section Sample No. | Evaluation | | |
|---|---|---|---|---|---|
| | | | Amount of emission of NMHC | Amount of emission of NOx | Amount of emission of NMHC and NOx |
| Example 1 | A | a | 1.000 | 1.000 | 1.000 |
| Example 2 | B | a | 0.968 | 0.970 | 0.969 |
| Example 3 | C | a | 0.984 | 0.964 | 0.978 |
| Example 4 | D | a | 1.000 | 0.970 | 0.992 |
| Example 5 | B | b | 0.973 | 0.970 | 0.972 |
| Example 6 | B | c | 1.000 | 0.988 | 0.997 |
| Example 7 | B | d | 0.975 | 0.982 | 0.977 |
| Example 8 | B | e | 0.973 | 0.976 | 0.974 |
| Comparative Example 1 | E | a | 1.105 | 1.036 | 1.086 |
| Comparative Example 2 | F | a | 1.096 | 1.251 | 1.139 |
| Comparative Example 3 | F | f | 1.071 | 1.269 | 1.126 |

As seen in Table 3, the combinations of the first exhaust gas treatment section and the second exhaust gas treatment section in Examples 1 to 8 exhibited a smaller amount of total emission of NMHC and NOx than the combinations of the first exhaust gas treatment section and the second exhaust gas treatment section in Comparative Examples 1 to 3. This has verified that the combinations of the first exhaust gas treatment section and the second exhaust gas treatment section in Examples 1 to 8 according to the present invention contribute to decreasing the amount of cerium oxide to be used, and achieving high exhaust gas purification performance.

REFERENCE SIGNS LIST

1 Exhaust gas purification system
2 Exhaust pipe
3 First exhaust gas treatment section
  31 Flow-through type substrate
    311 Cell
    312 Partition wall
  32 First catalyst layer
4 Second exhaust gas treatment section
  41 Wall-flow type substrate
    411 Inflow-side cell
    412 Outflow-side cell
    413 Partition wall
  42 Second catalyst layer
  43 Third catalyst layer
  44 First sealing member
  45 Second sealing member
X Exhaust gas flow direction

The invention claimed is:

1. An exhaust gas purification system configured to purify exhaust gas emitted from an internal combustion engine, the exhaust gas purification system comprising:
an exhaust gas path through which exhaust gas flows;
a first exhaust gas treatment section provided upstream in the exhaust gas path; and
a second exhaust gas treatment section provided downstream in the exhaust gas path,
wherein the first exhaust gas treatment section comprises:
a flow-through type substrate; and
first catalyst layers,
wherein the flow-through type substrate comprises:
cells each extending in the exhaust gas flow direction, and each having an open end on an exhaust gas inflow side thereof in the exhaust gas flow direction and an open end on an exhaust gas outflow side thereof in the exhaust gas flow direction; and
a partition wall separating the cells from one another,
wherein the first catalyst layers each comprise a portion that is formed on a surface of the partition wall,
wherein the second exhaust gas treatment section comprises:
a wall-flow type substrate;
second catalyst layers; and
third catalyst layers,
wherein the wall-flow type substrate comprises:
inflow-side cells each extending in the exhaust gas flow direction, and each having an open end on an exhaust gas inflow side thereof in the exhaust gas flow direction and a closed end on an exhaust gas outflow side thereof in the exhaust gas flow direction;
outflow-side cells each extending in the exhaust gas flow direction, and each having a closed end on an exhaust gas inflow side thereof in the exhaust gas flow direction and an open end on an exhaust gas outflow side thereof in the exhaust gas flow direction; and
a porous partition wall separating the inflow-side cells and the outflow- side cells from one another,
wherein the second catalyst layers each have a portion that is formed on a surface on an inflow-side cell side of the partition wall, and extends from an end on an exhaust gas inflow side of the partition wall along the exhaust gas flow direction,
wherein the third catalyst layers each have a portion that is formed on a surface on an outflow-side cell side of the partition wall, and extends from an end on an exhaust gas outflow side of the partition wall along a direction opposite to the exhaust gas flow direction,
wherein the first catalyst layers each contain cerium element, wherein a percentage $P_1$ of a mass of the cerium element contained in the first catalyst layers in terms of cerium oxide, to a mass of the first catalyst layers, is 5.0% by mass or more and 13.0% by mass or less, wherein the second catalyst layers each contain rhodium element, wherein the second catalyst layers and the third catalyst layers each contain cerium element, and wherein a percentage $P_{23}$ of a total of a mass of the cerium element contained in the second catalyst layers in terms of cerium oxide, and a mass of the cerium element contained in the third catalyst layers in terms of cerium oxide, to a total of a mass of the second catalyst layers and a mass of the third catalyst layers, is 1.1 times or more and 5.3 times or less larger than the percentage $P_1$.

2. The exhaust gas purification system according to claim 1, wherein a percentage $P_2$ of a mass of the cerium element contained in the second catalyst layers in terms of cerium oxide, to a mass of the second catalyst layers, is larger than the percentage $P_1$.

3. The exhaust gas purification system according to claim 2, wherein the percentage $P_2$ is 1.1 times or more and 5.3 times or less larger than the percentage $P_1$.

4. The exhaust gas purification system according to claim 1, wherein a percentage $P_3$ of a mass of the cerium element contained in the third catalyst layers in terms of cerium oxide, to a mass of the third catalyst layers, is larger than the percentage $P_1$.

5. The exhaust gas purification system according to claim 4, wherein the percentage $P_3$ is 1.1 times or more and 5.3 times or less larger than the percentage $P_1$.

6. The exhaust gas purification system according to claim 1, wherein the third catalyst layers each contain a palladium element.

7. The exhaust gas purification system according to claim 1 wherein a density of the cells of the wall-flow type substrate is 200 cells per square inch or more and 400 cells per square inch or less.

8. The exhaust gas purification system according to claim 1, wherein a density of the cells in the flow-through type substrate is 400 cells per square inch or more and 1200 cells per square inch or less.

9. The exhaust gas purification system according to claim 1, wherein the percentage $P_1$ is 7.0% by mass or more and 11.0% by mass or less.

10. The exhaust gas purification system according to claim 1, wherein the percentage $P_{23}$ is 1.3 times or more and 4.2 times or less larger than the percentage $P_1$.

11. The exhaust gas purification system according to claim 1, wherein the percentage $P_1$ is 7.0% by mass or more and 11.0% by mass or less, the percentage $P_{23}$ is 1.3 times or more and 4.2 times or less larger than the percentage $P_1$.

12. The exhaust gas purification system according to claim 2, wherein the percentage $P_2$ is 1.1 times or more and 1.4 times or less larger than the percentage $P_1$.

13. The exhaust gas purification system according to claim 4, wherein the percentage $P_3$ is 1.1 times or more and 3.0 times or less larger than the percentage $P_1$.

14. The exhaust gas purification system according to claim 1, wherein the first catalyst layers each contain rhodium element.

15. The exhaust gas purification system according to claim 1, wherein the third catalyst layers each contain rhodium element.

16. The exhaust gas purification system according to claim 1, wherein the first catalyst layers each have a laminated structure.

17. The exhaust gas purification system according to claim 16, wherein the first catalyst layers each have a lower layer comprising palladium element, and an upper layer comprising rhodium element.

* * * * *